US012686019B2

(12) United States Patent
Erickson et al.

(10) Patent No.: US 12,686,019 B2
(45) Date of Patent: Jul. 21, 2026

(54) VENT ASSEMBLIES

(71) Applicant: 3M INNOVATIVE PROPERTIES COMPANY, St. Paul, MN (US)

(72) Inventors: Ryan D. Erickson, Roseville, MN (US); Anna M. Hegdahl, Maple Grove, MN (US); Stephen C.P. Joseph, Woodbury, MN (US); Steven J. Tarnowski, Mahtomedi, MN (US); Ryan P. Birringer, Minneapolis, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 737 days.

(21) Appl. No.: 17/775,740

(22) PCT Filed: Nov. 10, 2020

(86) PCT No.: PCT/IB2020/060589

§ 371 (c)(1),
(2) Date: May 10, 2022

(87) PCT Pub. No.: WO2021/094927

PCT Pub. Date: May 20, 2021

(65) Prior Publication Data

US 2022/0401978 A1 Dec. 22, 2022

Related U.S. Application Data

(60) Provisional application No. 62/933,628, filed on Nov. 11, 2019.

(51) Int. Cl.
*B05B 7/24* (2006.01)
*B05B 11/00* (2023.01)

(52) U.S. Cl.
CPC .......... *B05B 7/2408* (2013.01); *B05B 7/2478* (2013.01); *B05B 11/0039* (2018.08)

(58) Field of Classification Search
CPC .. B05B 7/2408; B05B 7/2478; B05B 11/0039
(Continued)

(56) References Cited

U.S. PATENT DOCUMENTS 3,090,530 A * 5/1963 Peeps ...................... B05B 7/241 222/400.7
3,224,617 A 12/1965 Hohl et al.
(Continued)

FOREIGN PATENT DOCUMENTS

EP 0954381 B2 1/2009
EP 2160252 B1 1/2013
(Continued)

OTHER PUBLICATIONS

International Search Report for PCT International Application No. PCT/IB2020/060589, mailed on Feb. 17, 2021, 5 pages.

*Primary Examiner* — Chee-Chong Lee
(74) *Attorney, Agent, or Firm* — Martha J. Engel; Melissa E. Buss; Jonathan V. Sry

(57) ABSTRACT

Vent assemblies for reservoirs and other closed systems. The vent assemblies include one or more apertures in a wall of the reservoir. A closure member is retained on the external surface of the reservoir by a closure member retainer and includes a first component and a second component, the second component is relatively conformable compared to the first component. The second component is positioned between the first component and the wall of the reservoir. A sealing surface is located on either the first component or the second component, where the sealing surface closes the aperture when the closure member is in an unvented posi-
(Continued)

tion, and the sealing surface does not close the aperture when the closure member is in a vented position.

2 Claims, 15 Drawing Sheets

(58) Field of Classification Search
USPC .......................................................... 239/302
See application file for complete search history.

(56) References Cited

U.S. PATENT DOCUMENTS 3,524,589 A * 8/1970 Pelton, Jr. ............. B05B 7/2421 239/409
3,714,967 A * 2/1973 Zupan ................... B05B 7/2408 239/318
3,784,041 A 1/1974 Birch
4,730,753 A * 3/1988 Grime ................... B05B 7/2408 222/630
5,582,350 A * 12/1996 Kosmyna ................ B05B 15/55 239/DIG. 14
5,588,562 A * 12/1996 Sander ............... B65D 41/3447 222/541.6
6,039,218 A * 3/2000 Beck .................. B65D 41/3447 222/521
7,090,148 B2 8/2006 Petrie et al.
7,416,140 B2 8/2008 Camilleri et al.
7,614,571 B2 11/2009 Camilleri et al.
9,282,838 B2 3/2016 Sims
2004/0021720 A1 2/2004 Abello
2004/0217201 A1 11/2004 Ruda
2007/0015834 A1 1/2007 Flashner-Barak et al.
2007/0158349 A1 7/2007 Schmon et al.
2015/0020325 A1 1/2015 Yoshida et al.
2015/0203259 A1 7/2015 Mulvaney et al.

FOREIGN PATENT DOCUMENTS

WO 2010/076326 A1 7/2010
WO 2018/218813 A1 12/2018
WO 2019/012500 A1 1/2019

* cited by examiner

VENT ASSEMBLIES

CROSS REFERENCE TO RELATED APPLICATIONS

This application is a national stage filing under 35 U.S.C. 371 of PCT/IB2020/060589, filed Nov. 10, 2020, which claims the benefit of U.S. Application No. 62/933,628, filed Nov. 11, 2019, the disclosure of which is incorporated by reference in its/their entirety herein.

FIELD OF INVENTION

The present invention relates to vent assemblies and articles containing the vent assemblies. Vent assemblies provide a means for venting or exposing the contents of a reservoir or other closed system to the atmosphere. Vent assemblies can be used in a number of applications, including facilitating the delivery of liquid from reservoirs to fluid spray guns.

BACKGROUND

Reservoirs and other similarly constructed closed systems used in the dispensing of liquids often require venting so that air can enter the reservoir as liquid is removed therefrom. One example of reservoirs that may require venting are those used to deliver contents to liquid spray guns. Spray guns are widely used, for example, in vehicle body repair shops to spray a vehicle with liquid coating such as primer, paint and/or clearcoat. Typically, the spray gun includes a body, nozzle and trigger. The liquid coating is typically supplied to the spray gun by a reservoir attached to the spray gun.

The use of disposable reservoirs for the preparation and spraying of liquid materials in, e.g., vehicle body repair shops, has become an accepted practice that contributes to quick turnaround and high throughput. Reservoirs are used for paint mixing and dispensing applications in the automotive refinishing industry, as well as tangential markets such as marine, aerospace, and general industrial/manufacturing.

The disposable reservoirs typically include a container having an opening at one end and a lid to cover the opening. The lid includes a structure that attaches either directly or indirectly to a spray gun and through which liquid is delivered from the reservoir to the spray gun. During use, the reservoir is typically placed in an orientation such that the liquid contained therein flows to the spray gun by the force of gravity. In such reservoirs, a vent is typically used to prevent the formation of a vacuum in the reservoir as liquid is delivered to the spray gun, thus facilitating a consistent liquid flow to the spray gun. Vented reservoirs are described, for example, in U.S. Pat. No. 7,090,148 B2 (Petrie et al.); EP Patent No. 0954381 B2 (Joseph et al.); and U.S. Publication No. 2015/0203259 (Mulvaney, et al.).

SUMMARY

A potential problem with current vented reservoirs is leakage of liquid through the vent assemblies during, for example, filling, storage and/or transport of the reservoir. The contact surfaces of vent assemblies and reservoirs are typically made of rigid materials that may not be pliable enough to provide a leakproof seal under all conditions. Moreover, vent assemblies comprise components that are often made from plastic materials. Plastic materials can absorb certain types of liquids (e.g., solvents) that over time can lead to swelling and/or distortion of the components, potentially compromising the vent assembly. Nylon-6, in particular, will absorb water on hot, humid days, increasing the chance for a leak. Therefore, there is a need for vent assemblies that work effectively in a variety of conditions and with a variety of liquids.

The vent assemblies of the present disclosure address the above-identified problems. The disclosed vent assemblies are typically made from materials that resist solvent effects and include a rigid component and conformable component that together improve the liquid seal between contact surfaces of the vent assembly, thus reducing or eliminating leakage of the reservoir at the site of the vent assembly.

In one embodiment, the present disclosure provides a vent assembly comprising: an aperture formed in a wall of a reservoir, the reservoir having an internal surface defining the volume of the reservoir and an external surface; a closure member retained on the external surface of the reservoir, the closure member comprising a first component made of a material having a Shore A Hardness value greater than 100 as measured by ASTM D2240; a second component made of a material having a Shore A Hardness up to 100 as measured by ASTM D2240, the second component positioned between the first component and the wall of the reservoir; a sealing surface on the first component or the second component, where the sealing surface closes the aperture when the closure member is in an unvented position and the sealing surface does not close the aperture when the closure member is in a vented position; a closure member retainer configured to retain the closure member on the reservoir; and a cam surface between the closure member and the wall of the reservoir, the cam surface configured to generate a compressive force on the sealing surface when the closure member is moved into the unvented position.

In another embodiment, the present disclosure provides a vent assembly comprising: an aperture formed in a wall of a reservoir, the reservoir having an internal surface defining the volume of the reservoir and an external surface; a closure member retained on the external surface of the reservoir, the closure member comprising a first component made of a material having a Shore A Hardness value greater than 100 as measured by ASTM D2240; a second component made of a material having a Shore A Hardness up to 100 as measured by ASTM D2240, the second component positioned between the first component and the wall of the reservoir; a sealing surface on the first component or the second component, where the sealing surface closes the aperture when the closure member is in an unvented position and the sealing surface does not close the aperture when the closure member is in a vented position; a closure member retainer configured to retain the closure member on the reservoir, wherein the closure member is displaced from the wall of the reservoir when moving from the unvented position to the vented position.

As used herein:

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of" Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

Reference throughout this specification to "some embodiments" means that a particular feature, configuration, composition, or characteristic described in connection with the embodiment is included in at least one embodiment of the disclosure. Thus, the appearances of such phrases in various places throughout this specification are not necessarily referring to the same embodiment of the disclosure. Furthermore, the particular features, configurations, compositions, or characteristics may be combined in any suitable manner in one or more embodiments.

The term "cam surface" means a surface that will facilitate linear displacement of an object that is rotated along the surface. For example, rotating an object along a cam surface surrounding a post will lead to linear displacement of that object up or down the post, depending upon the direction of rotation.

The term "overlie" means to extend over so as to at least partially cover another layer or element. Overlying layers can be in direct or indirect contact (e.g., separated by one or more additional layers).

The above summary of the present disclosure is not intended to describe each disclosed embodiment or every implementation of the present disclosure. The description that follows more particularly exemplifies illustrative embodiments.

Figure 1A:
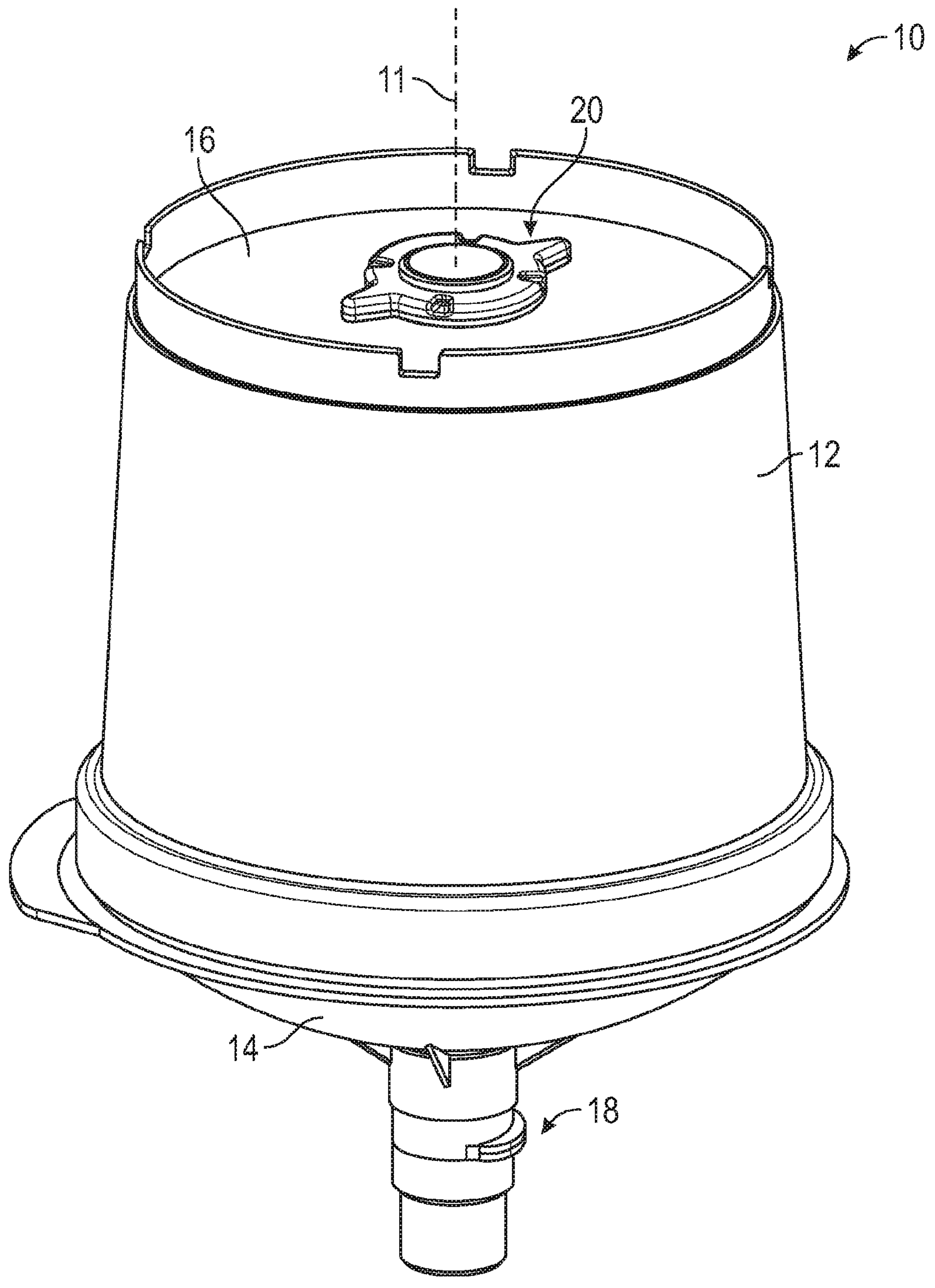
FIG. 1A is a perspective view of a reservoir containing one embodiment of a vent assembly of the present disclosure.

With reference to the figures, like reference numbers offset by multiples of 100 (e.g., 31, 231, 331) indicate like elements. Unless otherwise indicated, all figures and drawings in this document are not to scale and are chosen for the purpose of illustrating different embodiments of the invention. In particular, the dimensions of the various components are depicted in illustrative terms only, and no relationship between the dimensions of the various components should be inferred from the drawings, unless so indicated.

DETAILED DESCRIPTION

In the following description of illustrative embodiments, reference is made to the accompanying figures of the drawing which form a part hereof, and in which are shown, by way of illustration, specific embodiments. It is to be understood that other embodiments may be utilized and structural changes may be made without departing from the scope of the present invention.

The vent assemblies and reservoirs described herein may be used to prevent the formation of a vacuum in closed systems during dispensing of liquids. Venting eliminates the vacuum and provides for a more uniform, consistent delivery of liquid. The vented assemblies disclosed herein can be used in a variety of applications. One exemplary application includes a liquid spray delivery system in which liquid is dispensed from a reservoir to a liquid spray gun. The reservoirs may be attached directly to the spray gun or delivered to the spray gun through a supply line (e.g., hose, tubing, etc.) that extends from the reservoir to the spray gun. Liquid spray guns are preferably sized for use as hand-held spray guns and may be used in methods that involve the spraying of one or more selected liquids.

Figure 5:
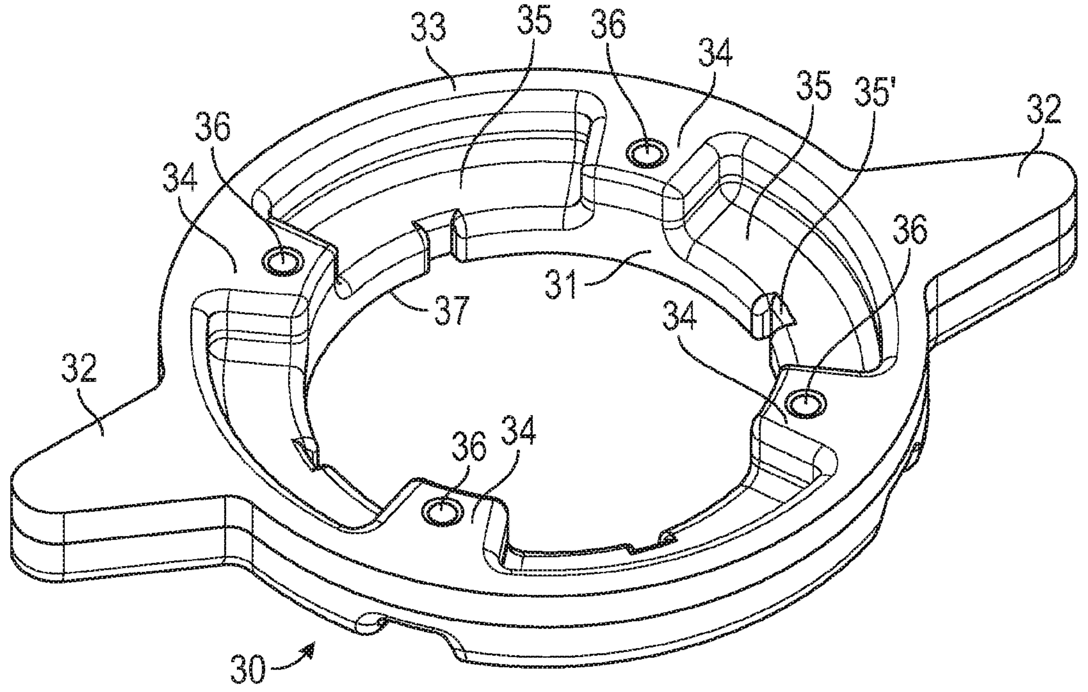
FIG. 5 is a bottom perspective view of the closure member used in the vent assemblies of FIGS. 1 and 2.
Figure 6:
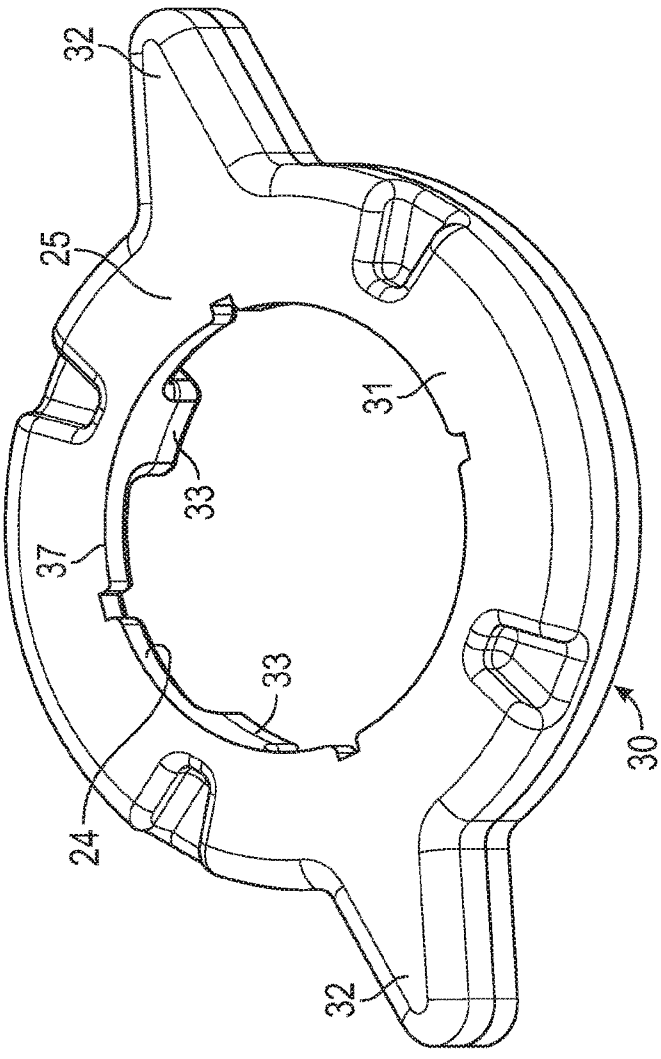
FIG. 6 is a top perspective view of the closure member used in the vent assemblies of FIGS. 1 and 2.
Figure 7:
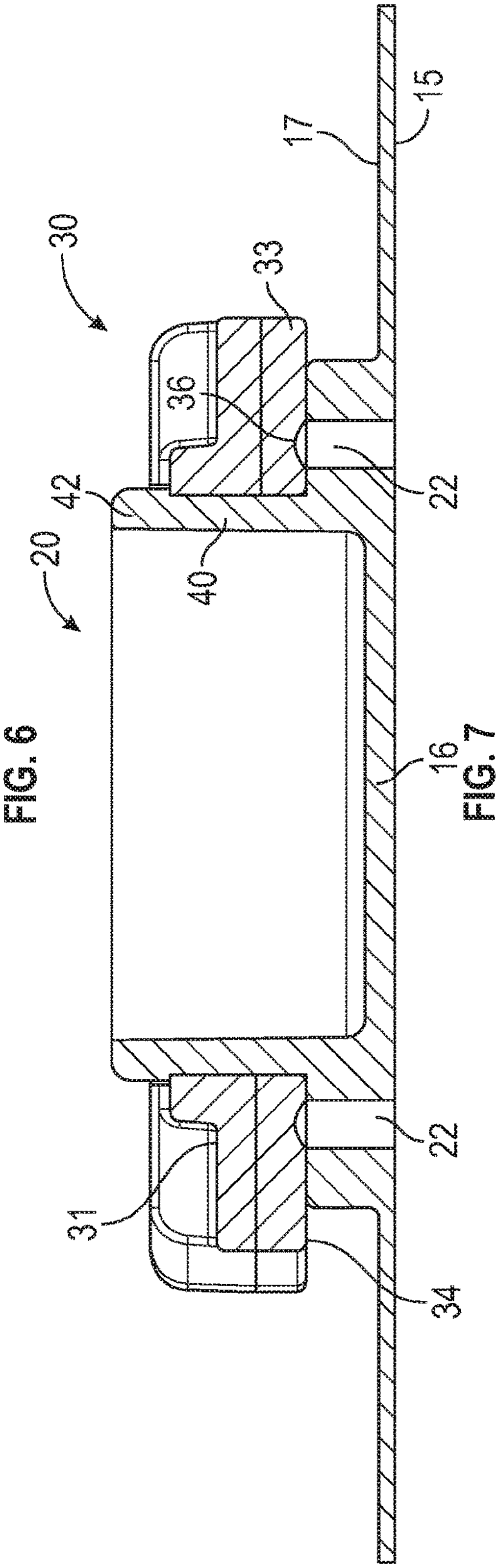
FIG. 7 is a cross-sectional view of the vent assembly of FIGS. 1 and 2.

One illustrative embodiment of a vent assembly as described herein is depicted in connection with FIGS. 1-10. Referring to FIGS. 1 and 7, the vent assembly 20 is located in a wall of a reservoir 10 having an internal surface 15 defining the volume of the reservoir and an external surface 17. The reservoir 10 includes a container 12 having an opening 21 defined by the container and a detachable lid 14 configured to close the opening. The reservoir 10 also includes a base 16 located on an opposite end of the container 12 from the opening 21. The detachable lid 14 (which can be removed from the opening of the container so that, e.g., the reservoir can be filled with a liquid through the opening) closes the opening 21 in the container 12 when the lid 14 is attached to the container 12. As further depicted in FIG. 1, the lid 14 (or any other suitable portion of the reservoir 10) may, in one or more embodiments, include structure 18, such as ports, etc., that may facilitate connection of the reservoir 10 to, e.g., a spray gun for dispensing a liquid contained therein. The container 12 and lid 14 may each be constructed of inexpensive polymeric materials such as, e.g., polypropylene, low density polyethylene (LDPE) and high density polyethylene (HDPE), although each may be constructed of any material that is suitable for containing the liquid to be housed in the reservoir 10. The container 12 and lid 14 may or may not be constructed of the same materials.

Although the depicted embodiment of container 12 is generally cylindrical such that it includes a cylindrical wall and a base 16 (which is also a wall as the term "wall" is used herein), other reservoirs with which the vent assemblies described herein may be used may, for example, not include a base, may have only one wall, may have two, three or more walls, etc. Essentially, the reservoirs with which the vent assemblies described herein may be used can take any suitable shape that includes at least one wall that defines a volume in which liquid can be contained and in which a vent assembly as described herein can be located.

In the illustrative embodiment depicted in FIG. 1, the vent assembly 20 is located in the base 16 of the reservoir 10. However, the vent assemblies described herein could be located in any wall of the reservoir 10 with the base 16 being only one example of a wall in which the vent assembly 20 could be located. For example, in one or more embodiments, the vent assembly 20 could be located in any wall forming a part of the container 12 or the lid 14. The vent assembly 20 is typically positioned above the liquid in the reservoir 10 (relative to the force of gravity) when the reservoir 10 is being used to dispense the liquid contained therein. Furthermore, although the reservoir 10 includes only one vent assembly 20, in one or more embodiments, the reservoir 10 could include two or more vent assemblies and those vent assemblies could be located in the same wall or in different walls of the reservoir 10.

As described herein, the vent assembly 20 is movable between a vented position and an unvented position. The vent assembly 20 is typically placed in the unvented position when the reservoir 10 is being filled with a liquid through, e.g., the opening in the container 12. By placing the vent assembly 20 in the unvented position, leakage of the liquid used to fill the reservoir 10 through the vent assembly 20 is typically prevented when the liquid is located above the vent assembly 20.

The reservoir 10 may be inverted during use (when, e.g., attached to a spray gun) such that the base 16 is located above the lid 14. That change in orientation places the vent assembly 20 above the liquid in the reservoir 10. Movement of the vent assembly 20 from the unvented position to the vented position when the vent assembly 20 is located above the liquid in the reservoir 10 allows for entry of air into the volume of the reservoir 10 without allowing the liquid to leak through the vent assembly 20.

FIGS. 1-10 depicted various components and features of one illustrative embodiment of a vent assembly 20 that may be used in connection with the reservoirs 10 as described herein.

Figure 1B:
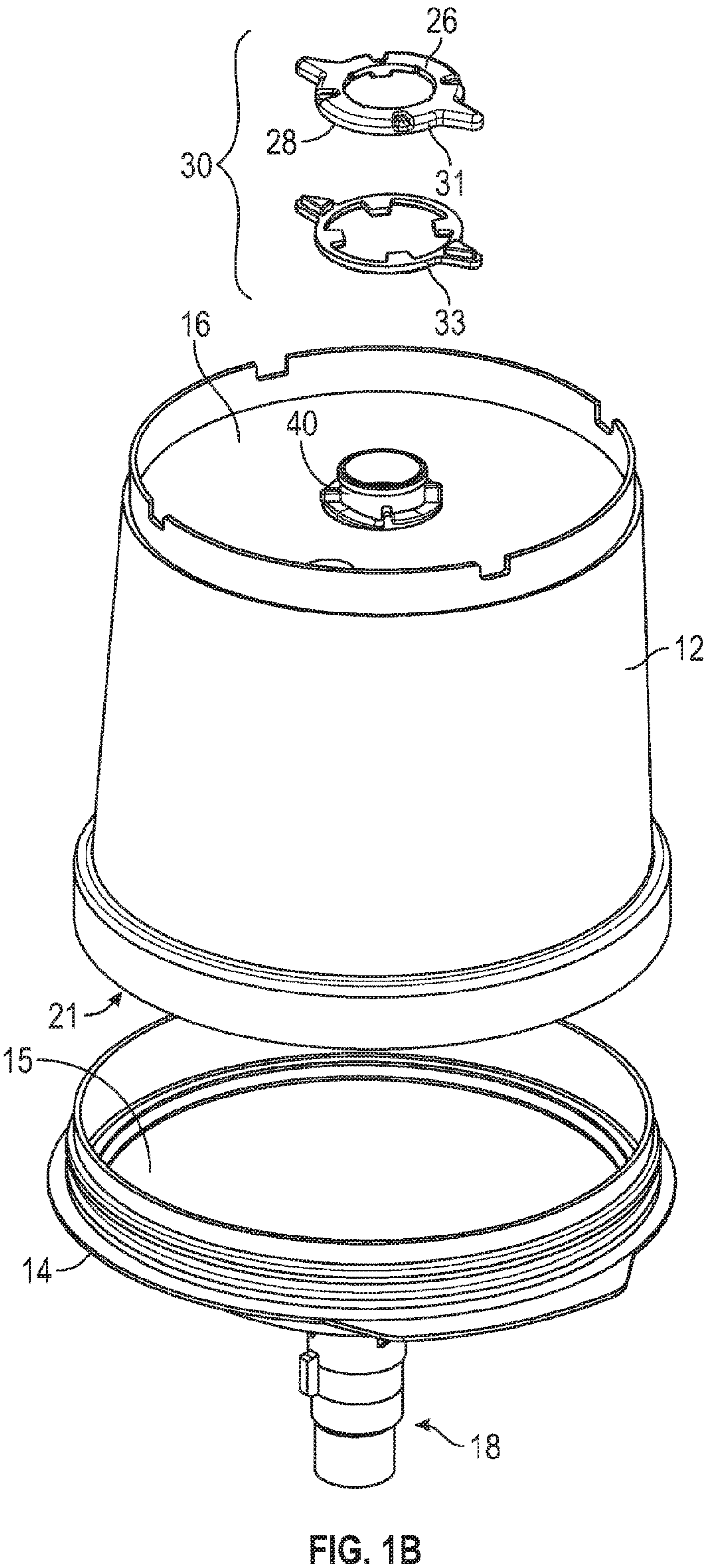
FIG. 1B is an expanded perspective view of the reservoir and vent assembly in FIG. 1A.
Figure 2:
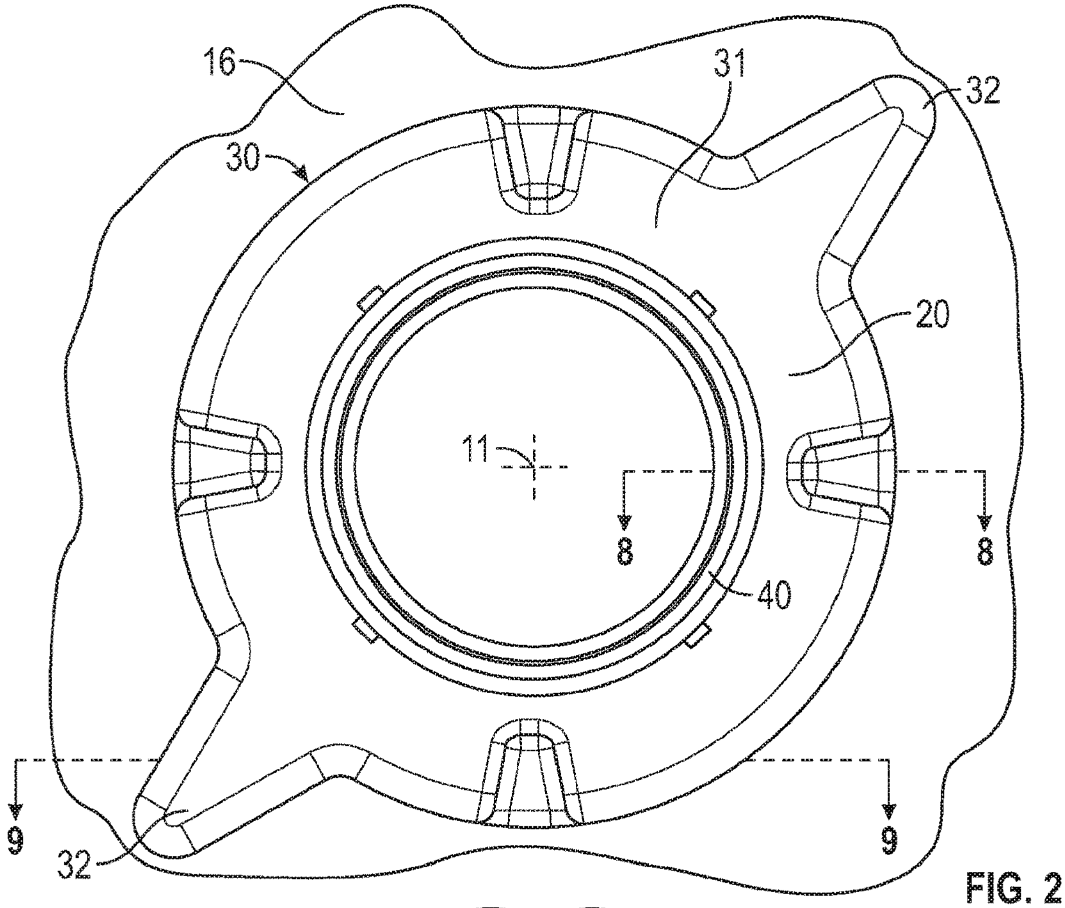
FIG. 2 is a plan view of the vent assembly of FIGS. 1 and 2.

Referring to FIGS. 1 and 2, the vent assembly 20 includes a closure member 30 mounted on a post 40 that, in the illustrative embodiment, extends from the base 16 of the reservoir 10 (although, as discussed herein, the vent assembly could be located in any wall of the reservoir). The closure member 30 is configured for rotation on the post 40 about an axis 11 that extends through the post 40 and the base 16 of the reservoir 10. The post 40 can be solid or hollow.

The closure member 30 may include two or more extensions 32 to assist the user in rotating the closure member 30 by hand. It should, however, be understood that the closure member 30 may be designed for rotation using a tool designed for that function. Further, extensions 32 represent only one example of many different structures that could be used to facilitate manual rotation of the closure member 30 about the post 40.

Figure 3:
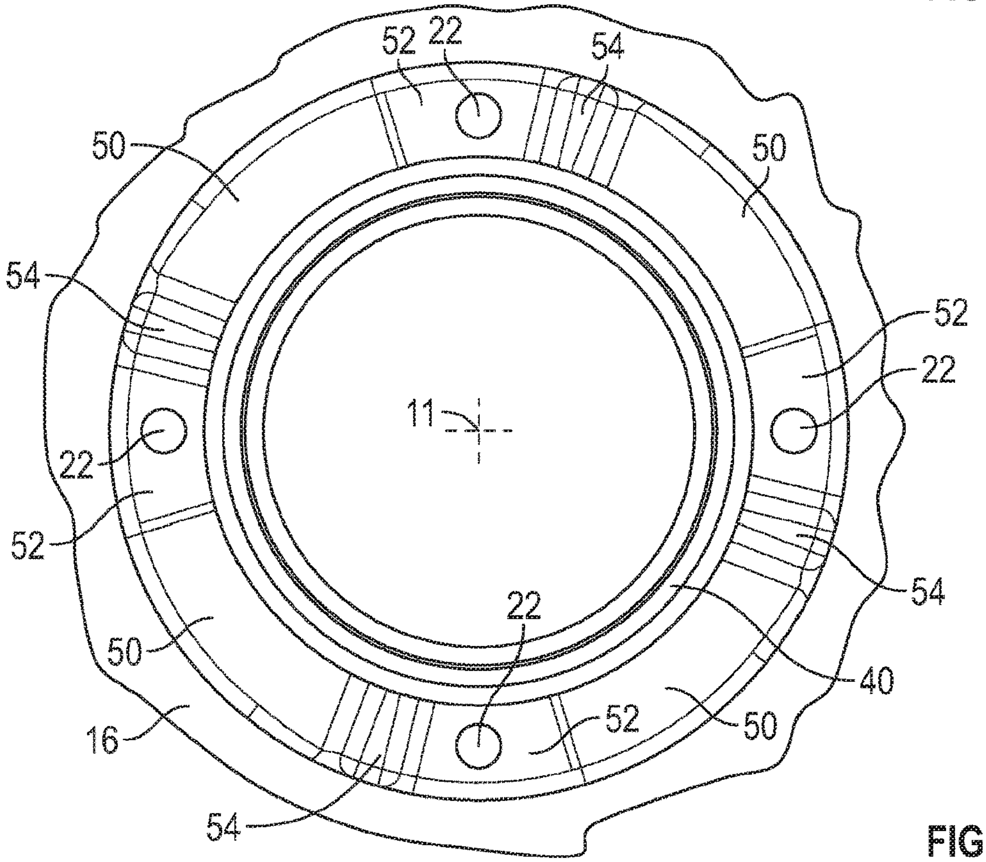
FIG. 3 is a plan view of the vent assembly of FIGS. 1 and 2 with the closure member removed to expose the cam surface and apertures of the vent assembly.
Figure 4:
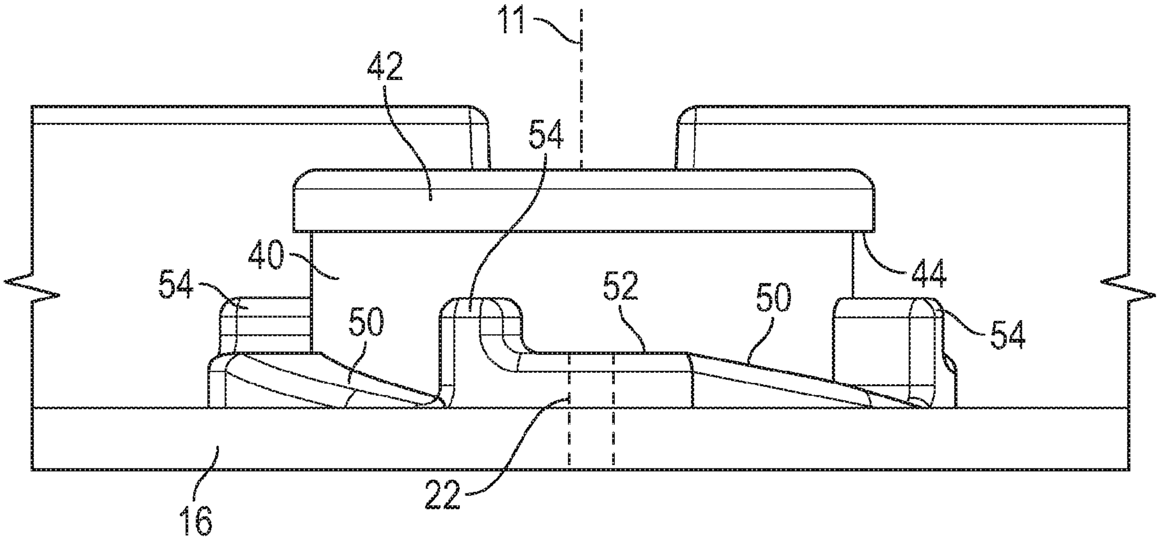
FIG. 4 is a side view of FIG. 3.

FIGS. 3 and 4 depict the vent assembly 20 with the closure member 30 removed. Referring to FIG. 3, the post 40, through which axis 11 extends, is surrounded by features that cooperate with the closure member 30 to provide both the vented position and the unvented position of the vent assembly 20. Those features include cam surfaces 50 which terminate in aperture surface portions 52. In the illustrative embodiment, each of the aperture surface portions 52 includes an aperture 22 located therein such that the aperture 22 extends through the aperture surface portion 52 of the cam surface 50. The aperture 22 extends through the base 16 and allows air to enter the container 12 when the aperture 22 is not blocked or otherwise closed by features on the closure member 30 as will be described herein. Although the illustrative embodiment includes four apertures, it should be understood that vent assemblies 20 as used in the reservoirs 10 described herein may include as few as one aperture or any other number of apertures selected based on many different factors that relate to the venting performance required. The features depicted in FIGS. 3 and 4 further include stops 54 that are provided to limit rotation of the closure member 30 about the post 40 when the vent assembly 20 is in the unvented position.

Also depicted in FIG. 4 is a closure member retainer 42 located on the post 40 above the cam surfaces 50 and aperture surface portions 52. The closure member retainer 42 includes a shoulder 44 that extends outwardly from the post 40 (where outwardly is radially away from the axis 11). The shoulder 44 faces the base 16 and the cam surfaces 50 and the aperture surface portions 52. The closure member retainer 42 preferably interacts with the closure member 30 on the post 40 to retain the closure member 30 on the post 40 when the vent assembly 20 is in the vented position. That function is, in the illustrative embodiment of FIGS. 1-10, provided by a mechanical interference between the closure member 30 and the closure member retainer 42. The closure member retainer 42 also preferably interacts with the closure member 30 to provide a compressive force that assists in closing or sealing of the apertures 22 in the aperture surface portions 52 as is described herein.

The cam surfaces 50 preferably rise gradually from the base 16 to the aperture surface portions 52 so that relatively smooth operation of the closure member 30 is achieved as closure member 30 is rotated from the vented position to the unvented position and vice versa. Rotation of the sealing surfaces of the closure member 30 past aperture surface portions 52 is, in the illustrative embodiment, prevented by stops 54 positioned adjacent the aperture surface portions 52. The stops 54 are only one embodiment of many different structures that could be used to limit rotation of the closure member 30 about the post 40. For example, in one or more embodiments, stops may be located on the base 16 for interaction with extensions 32 (see, e.g., extensions 32 in FIG. 2) to limit rotation of the closure member 30 about the axis 11 extending through post 40.

Although not necessarily required, it may be advantageous to provide cam surfaces 50 having aperture surface portions 52 that are relatively flat and that are located in a plane that is perpendicular to axis 11 about which closure member 30 rotates. That orientation may provide improved closure of the apertures 22 by the closure member 30, as discussed herein.

In one or more embodiments, it may be preferred that all of the features depicted in FIGS. 3 and 4 be molded of the same material, e.g., a thermoplastic such as polypropylene. Such a construction is not, however, required and one or more of the different features may be constructed of different materials that are joined or connected together by any suitable technique or combination of techniques. In one or more embodiments, the additional material used to construct the cam surfaces 50, aperture surface portions 52, and stops 54 may, along with post 40, provide additional rigidity to the base 16 that facilitates proper operation and closure of the apertures 22.

FIG. 5 is a view of the underside or bottom surface of the closure member 30, i.e., the surface of the closure member 30 that faces the base 16 of the reservoir assembly 10. The extensions 32 are depicted in FIG. 5 along with sealing surfaces 34 and relief surfaces 35 that are positioned between the sealing surfaces 34. Rotation of the closure member 30 about a post 40 as described herein moves the sealing surfaces 34 and relief surfaces 35 such that, when the closure member 30 is in the vented position, the relief surfaces 35 are located over the apertures 22. Because the relief surfaces 35 do not close the apertures 22, air is allowed to pass through the apertures 22 into the container 12 of the reservoir assembly 10. As depicted, the relief surfaces 35 may optionally include one or more supplemental notches 35' that may further enhance the movement of air through the vent assembly. When the closure member 30 is in the unvented position, the sealing surfaces 34 are positioned over the apertures 22 such that air is prevented or at least severely restricted from passing through the apertures 22. Another characterization of the effect of locating sealing surfaces 34 over apertures 22 is that sealing surfaces 34 preferably form a liquid-tight seal over the apertures 22 such that liquid within the container 22 does not pass through the apertures 22.

Although the closure members 30 used in vent assemblies 20 as described herein will typically include a number of sealing surfaces 34 that match the number of apertures 22, such a relationship is not necessarily required. For example, in one or more embodiments, the closure member 30 may include a single sealing surface that extends completely or nearly completely about the circumference of the closure member 30 if, when the closure member 30 is in the vented position, the sealing surface 34 is not in a position to close the apertures 22. For example, the closure member 30 may be only loosely retained on the post such that air can pass between the sealing surface 34 into the apertures 22 even when the closure member 30 does not include relief surfaces 35.

The sealing surface 34 may be configured so that it covers but does not protrude into the aperture 22 when the closure member 30 is in the unvented position. For example, in the embodiment illustrated in FIG. 5, the sealing surface 34 comprises a recess 36, at least a portion of which will lie directly over the aperture 22 when the closure member 30 is in the unvented position. Alternatively, the sealing surface 34 may be configured to at least partially protrude into the aperture when the closure member is in the unvented position. In some embodiments, the sealing surface can be made of a conformable material that protrudes into the aperture under the forces applied to the closure member when in the unvented position. In other embodiments, the sealing surface can include projections sized to at least partially enter the aperture when the closure member is in the unvented position.

In the embodiment illustrated in FIGS. 1-10, the closure member 30 is retained on the external surface of the reservoir and comprises a first component 31 and second component 33. The first component 31 is relatively rigid or stiff compared to the second component 33, whereas the second component is relatively conformable compared to the first component. The first component provides the structural integrity needed to manually adjust the closure member from a vented to unvented position and transfers the forces necessary to seal the aperture when the closure member is in the unvented position. In contrast, the second component is typically adjacent to the wall of the reservoir when the closure member is in the unvented position and is made of a material that conforms to imperfections or deviations in the contact surface of the vent assembly (e.g., tolerance variations due to molding processes and/or swelling due to environmental factors) so that the aperture is properly sealed when the closure member is in the unvented position. In at least one embodiment, the second component is conformable. The two components are typically made of materials that resist swelling or distortion from humidity or exposure to the liquids in the reservoir.

In at least one embodiment, "relatively rigid" can mean that the first component is stiff. The term "rigid" or "stiff" can be established by a specific range of hardness or modulus of elasticity values as described herein.

The first component is made of a material having a Shore A Hardness value greater than 100, as measured by ASTM 2240. In some embodiments, the first component is made of a thermoplastic material. Exemplary materials include a polypropylene, high density polyethylene (HDPE), polyamides, polyesters (e.g., polybutylene terephthalate and polyethylene terephthalate), a glass-filled polyamide, an acetal and combinations thereof. The first component typically has a modulus of elasticity greater than that of the second component. In at least one embodiment, the first component has a modulus of elasticity that is at least 0.6 GPa, at least 0.8 GPa, at least 1 GPa, or at least 1.2 GPa.

In at least one embodiment, "relatively conformable" can mean that the second component is more elastic than the first material. In another embodiment, the term "conformable" can indicate that the second component falls within a specific range of hardness or modulus of elasticity values.

In at least one embodiment, the second component 33 is made of a material having a Shore A Hardness less than 100 as measure by ASTM D2240. In some embodiments, the Shore A Hardness of the material making up the second component may be less than 90, less than 80, less than 70, less than 60 or even less than 50. In some embodiments, the Shore A Hardness of the material making up the second component may be greater than 20, greater than 30 or even greater 40. In some embodiments, the Shore A Hardness ranges from 20-90. In some embodiments, the second component may have a modulus of elasticity of less than 0.5 GPa (500 MPa), less than 0.1 GPa (100 MPa), less than 0.05 GPa (50 MPa), even less than 0.01 GPa (10 MPa), or even less than 0.006 GPa (6 MPa). In some embodiments, the second component may have a modulus of elasticity of greater than 0.001 GPa. In some embodiments, the modulus of elasticity ranges from 0.001 to 0.5 GPa. The second component is typically made from a thermoplastic elastomer, a thermoplastic vulcanizate, a rubber, and combinations thereof. In at least one embodiment, the modulus of elasticity for both the first component and the second component can be measured according to the Nano Indentation Test Method as described herein.

Although the second component 33, as illustrated in FIG. 1, is relatively co-extensive with the first component 31, it should be understood that the first and second components 31, 33 can have the same or different dimensions, e.g., shape, thickness, etc. In some embodiments, the first component 31 has a first major surface 26 and a second major surface 28 and the second component 33 overlies the second major surface 28 of the first component 31. The second component can overlie the entire second major surface of the first component or, as illustrated in FIG. 1B, overlie only a portion of the second major surface of the first component, as long as the second component either covers or seals off the aperture when the closure member is in an unvented position.

In the embodiment illustrated in FIGS. 1-10, the closure member 30 comprises both the first component 31 and the second component 33, and the sealing surface 34 is located on the second component 33. In an alternative embodiment illustrated in FIG. 11, the second component 33 forms at least part of the cam surface, more particularly at least part of the aperture surface portion 52 of the cam surface, and the sealing surface 34 is located on the first component of the closure member 30.

The second component can be molded separately and attached to either the first component or cam surface by any suitable technique or combination of techniques, such as adhesives, mechanical fasteners, dip coating, etc. Preferably, the two component closure member is made by an overmolding process, such as insert molding or two-shot molding.

Figure 8:
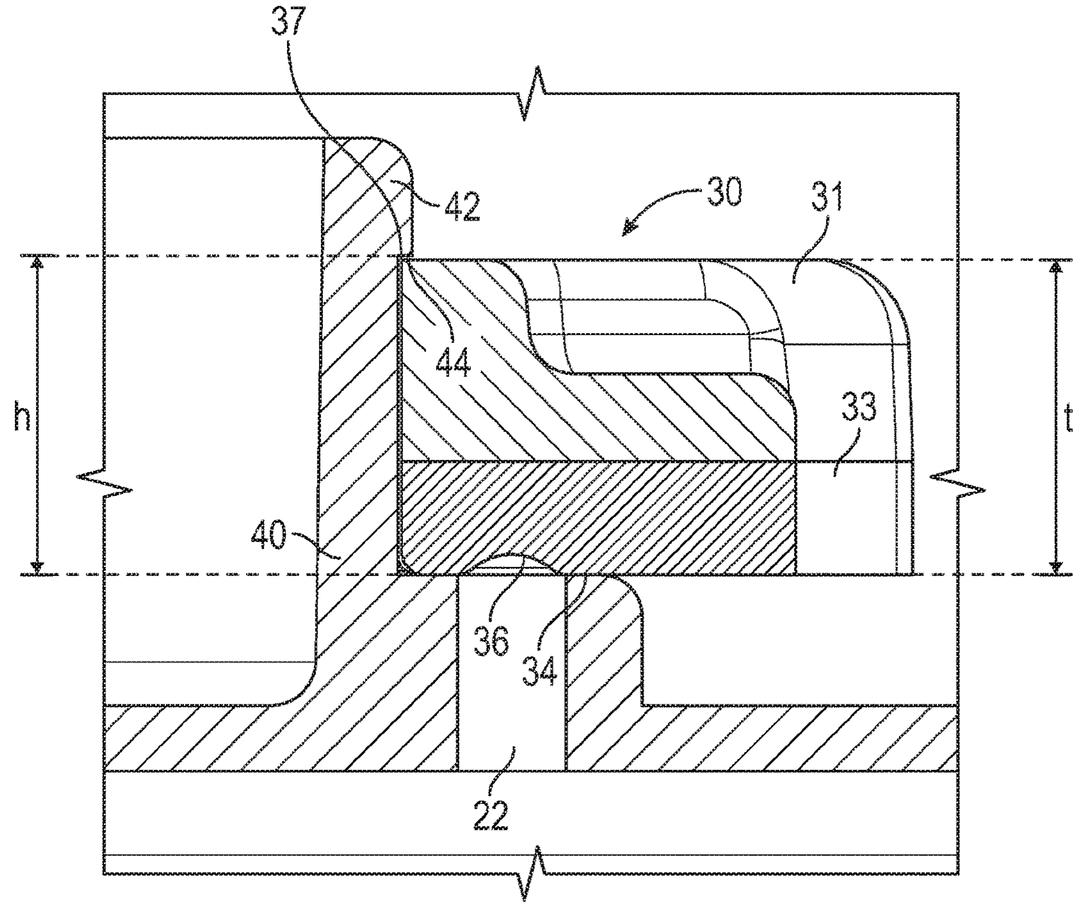
FIG. 8 is an enlarge cross-sectional view of the closure member of the vent assembly in FIGS. 1 and 2 taken along 8-8 in FIG. 2 showing the interaction between the closure member sealing surface and aperture and the interaction between the closure member retainer and the post.

FIGS. 6-8 depict other features that may be included in the closure members 30 of the vent assemblies 20 as described herein to provide improved sealing or closure of the apertures 22. In particular, the closure member 30 may include an inner surface 24 that faces the post 40 when the closure member 30 is mounted on the post 40. The closure member 30 may also include a top surface 25 that faces away from the base 16 of the reservoir 10. The closure member 30 may include an edge 37 where the inner surface 24 and the top surface 25 meet. The edge 37 in FIGS. 6-8 is portrayed as squared but may be arcuate (e.g., rounded) or any configuration in-between. The edge 37 mechanically engages with the shoulder 44 of the closure member retainer 42 as the closure member 30 is moved to an unvented position.

As illustrated in FIGS. 7 and 8, the wall of the post 40 is relatively perpendicular to the wall of the reservoir. The shoulder 44 of the closure member retainer 42 faces the aperture surface portion 52 (and, therefore, the base 16) and the shoulder 44 interacts with the edge 37, preferably in a manner that provides for compression of the sealing surface 34 toward the aperture surface portion 52 around the opening of aperture 22. The height h of the closure member retainer 42 above the aperture surface portion 52 may preferably be smaller than the thickness t of the closure member 30 located between the shoulder 44 of the closure member retainer 42 and the aperture surface portion 52 (although it should be understood that the opposite relationship is depicted in FIG. 8 only for clarity, i.e., in FIG. 8 h>t for clarity). The difference preferably provides for a compressive force that forces the sealing surface 34 towards the aperture surface portion 52 when the closure member is rotated into the unvented position. That compressive force may preferably provide two functions including a force that improves closure of the aperture 22 and that assists in retaining the closure member 30 in the unvented position due to friction generated between the sealing surface 34 and the aperture surface portion 52. In one or more embodiments, the compressive force may be generated when the shoulder 44 of the closure member retainer 42 contacts the edge 37 of the inner surface 36 of the closure member 30 when the closure member 30 is in the unvented position.

Figure 19:
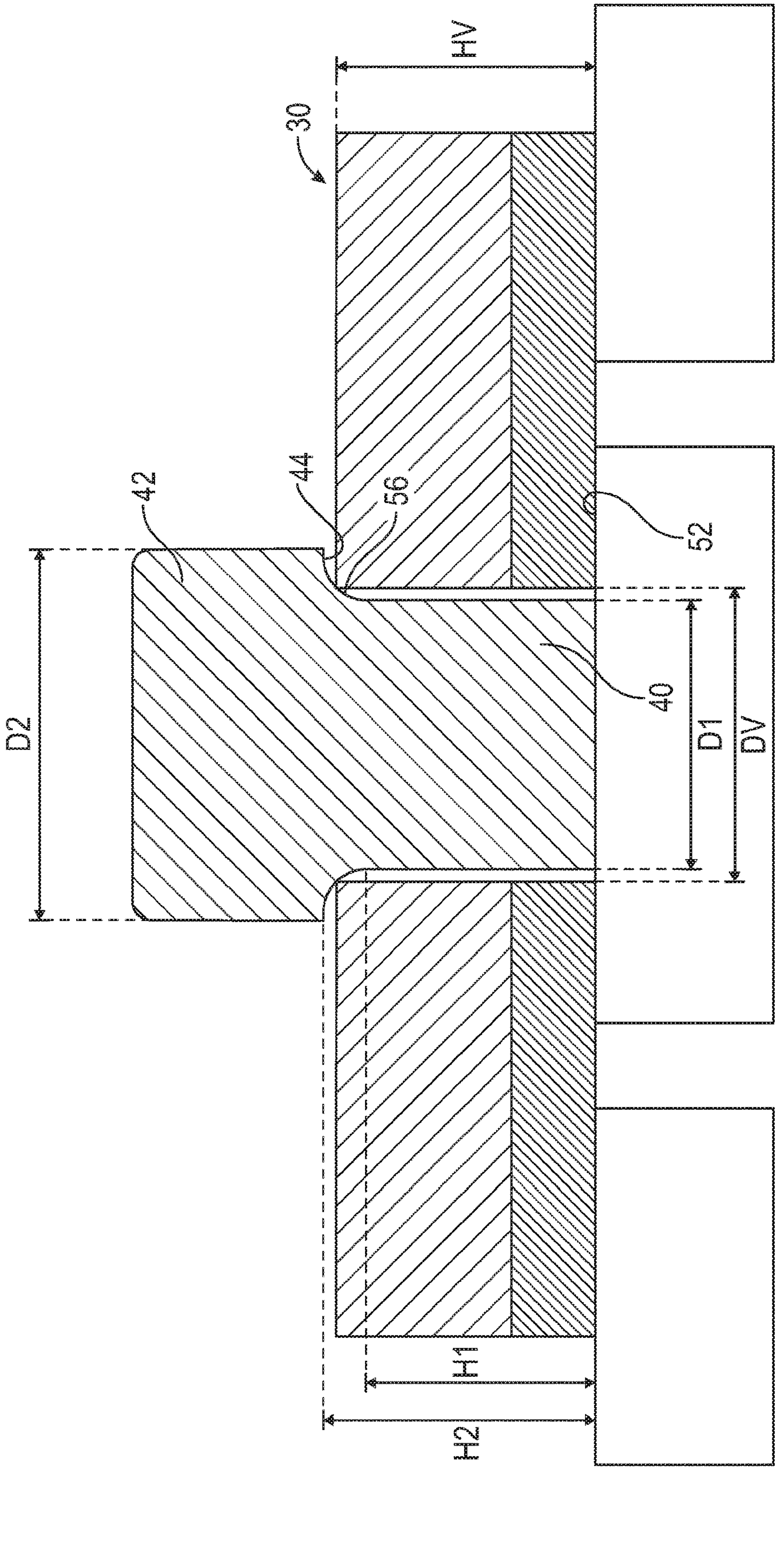
FIG. 19 is a schematic cross-sectional view of a vent assembly of the present disclosure.

In a preferable embodiment, as illustrated in FIG. 19, the outer diameter of the post increases near the closure member retainer 42. This increase in diameter creates an arcuate surface 56 between the wall of the post 40 and the closure member retainer 42. As the closure member 30 is rotated along the cam surface 52 into the unvented position, the closure member 30 moves up the post 40 and engages with the arcuate surface 56. As the closure member 30 continues upward, the closure member 30 meets with increasing resistance and sufficient downward force on the sealing surface 34 to create a liquid tight seal.

By increasing the diameter of the post 40 near the closure member retainer 42, as illustrated in FIG. 19, one can allow for variations (e.g., manufacturing tolerances) in the dimensions of the closure member 30 without effecting the sealing properties of the vent assembly. However, at some point, the diameter of the inner surface 24 of the closure member 30 becomes too small to fit around the post or too big to engage the closure member retainer 42 and/or the thickness of the closure member becomes to small or too large to effectively seal or vent the aperture of the vent assembly. In a preferred embodiment, the vent assembly is configured so that:

$$0.9D1 \leq DV < D2 \text{ and } H1 < HV < 1.2\ H2$$

where

D1 is the outer diameter of the post 40 at its narrowest dimension;

DV is the diameter of the inner surface 24 of the closure member 30, which encircles the post 40;

D2 is the outer diameter of the closure member retainer 42;

HV is the thickness of the closure member 30;

H1 is the height of the post 40, as measured from the aperture surface portion 52 to the point at which the post diameter begins to increase;

H2 is the height of the post 40, as measured from the aperture surface portion 52 to the shoulder 44.

Figure 9:
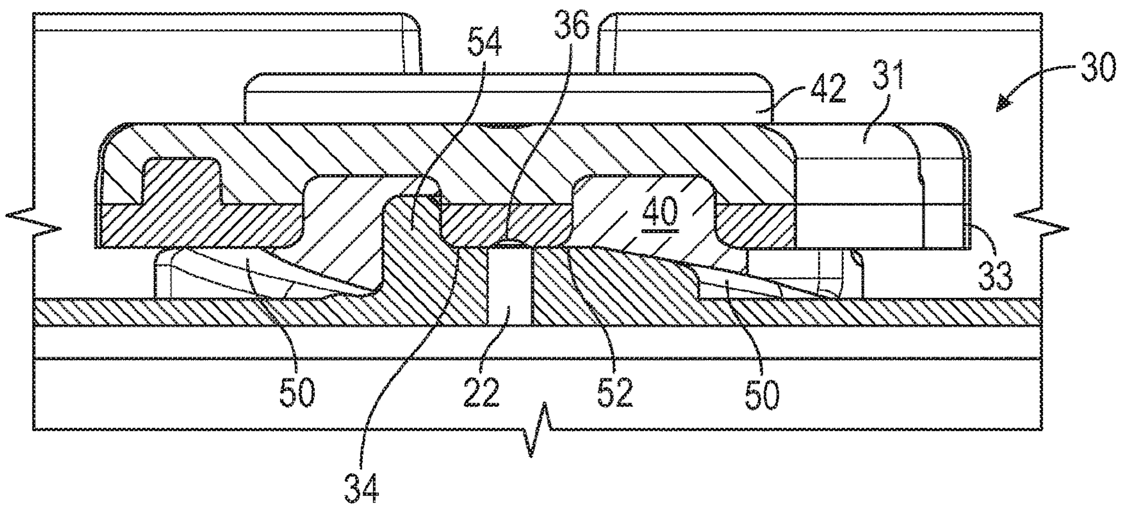
FIG. 9 is a cross-sectional view of the vent assembly of FIGS. 1 and 2 in the non-vented position taken along line 9-9 in FIG. 2.
Figure 10:
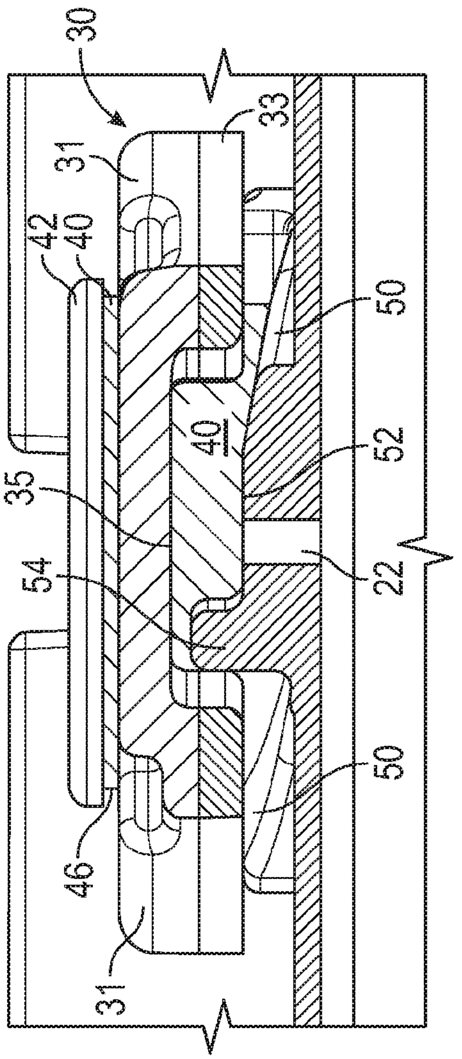
FIG. 10 is a cross-sectional view of the vent assembly of FIG. 9 after rotation of the closure member to the vented position.
Figure 11:
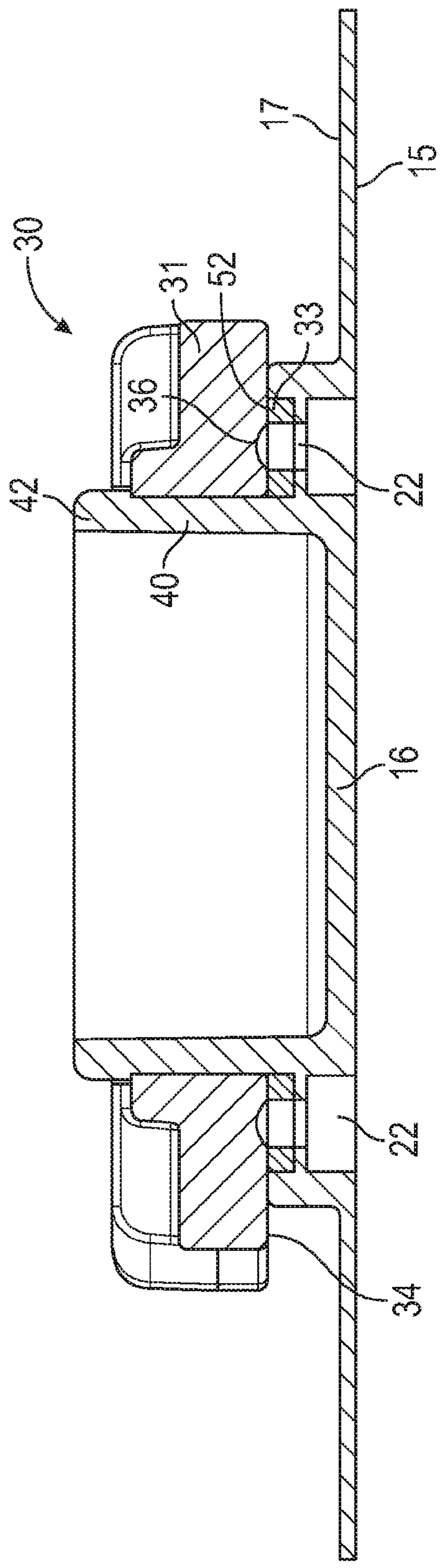
FIG. 11 is a cross-sectional view of an alternative vent assembly of the present disclosure.

Referring now to FIGS. 9-10, operation of the closure member 30 is depicted with the closure member 30 being located in the unvented position in FIG. 9 and in the vented position in FIG. 10. In the unvented position depicted in FIG. 9, the sealing surface 34 is positioned over the aperture surface portion 52 such that the aperture 22 is blocked by sealing surface 34. In the vented position depicted in FIG. 10, a relief surface 35 is located over the aperture 22 such that air can pass through aperture 22 in into the container as described herein.

In both FIGS. 9 and 10, interaction between the closure member retainer 42 on post 40 is seen. In FIG. 9, the closure member 30 is depicted as abutting the closure member retainer 42. In FIG. 10, the closure member 30 is in the vented position such that a gap 46 is observed between the closure member retainer 42 on post 40 and the closure member 30. As discussed herein however, closure member retainer 42 is preferably sized and shaped such that, even in the vented position, the closure member 30 is retained on the post 40.

Figure 12:
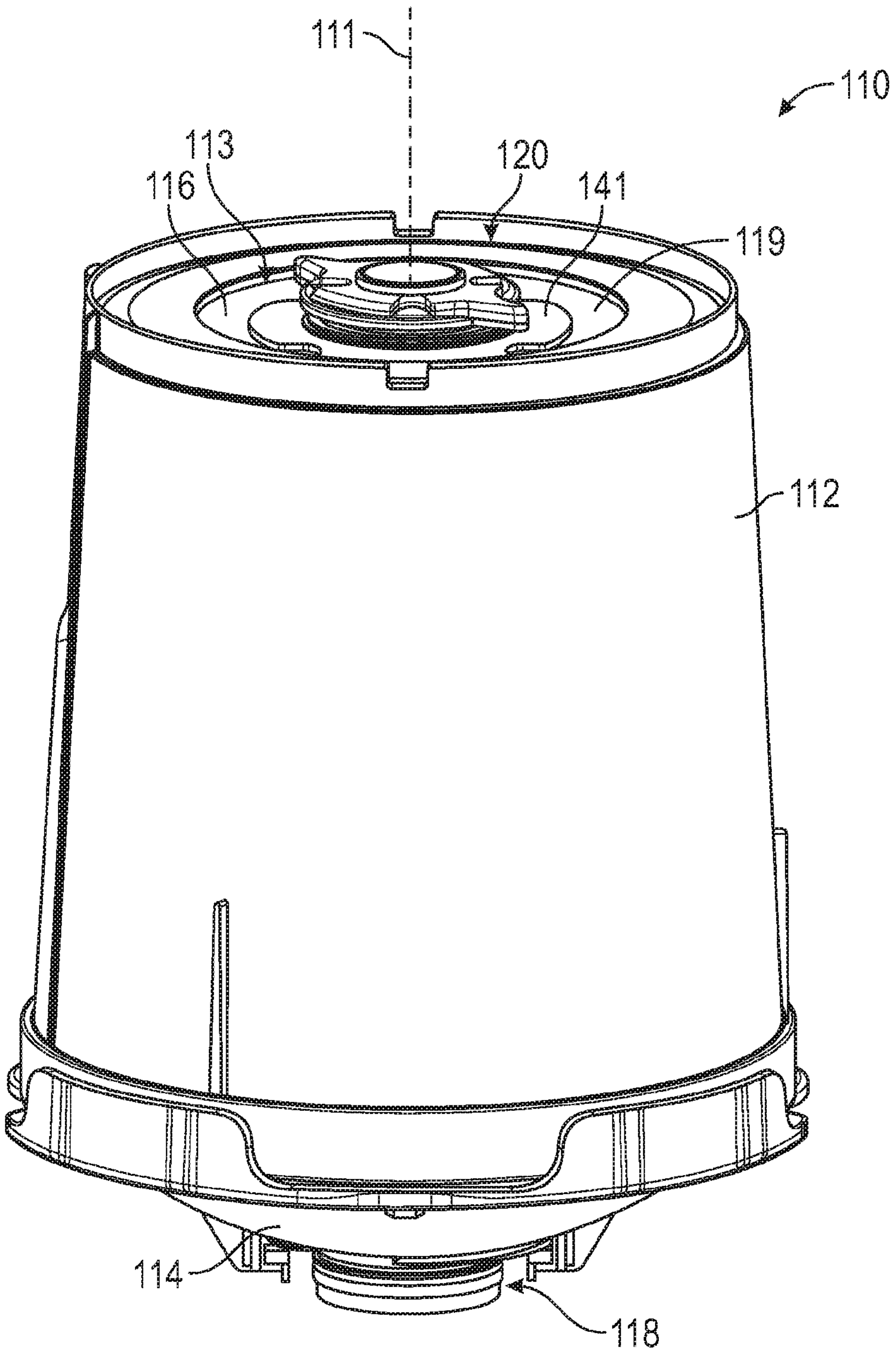
FIG. 12 is a perspective view of another reservoir containing a vent assembly of the present disclosure.

FIG. 12 is a perspective view of an alternative reservoir 110 of the present application. In this embodiment, the vent assembly 120 is located on a collapsible liner 119 that lines the inside of a self-supporting container 112. The liner 119 has an opening at one end and a base 116 (or wall) at the opposite end. The vent assembly 120 is in the base 116 of the liner 119. The container 112 has a first opening (not shown) and a second opening 113 opposite the first opening. The liner 119 is inserted into the first opening of the container 112 such that the vent assembly 120 projects through the second opening 113 of the container 112. A lid 114 is attached to the container 112 closing off the first opening to the liner 119. The lid 114, as in the above embodiments, comprises a structure 118 that directly or indirectly connects to a liquid spray gun. The vent assembly 120 is constructed similarly to the one embodied in FIGS. 1-10, except that the vent assembly 120 is secured to the collapsible liner 119 through a vent base 141 that is more rigid than the liner 119. Similar fluid delivery assemblies are described in, for example, International Patent Application No. WO 2019/012500.

The container, lid and vent assembly (including vent base) may be constructed of the same materials described above for the embodiments illustrated in FIGS. 1-10. The collapsible liner may be thermo/vacuum formed from a polymeric material. The liner may be made from, for example, polyethylene (e.g., low density polyethylene or high density polyethylene) or polypropylene. The liner may also be formed from a blend of polymeric materials, for example a blend of polyethylene and polypropylene, or a blend of low density polyethylene and linear low density polyethylene. The liner may optionally be thermo/vacuum formed from a thermoplastic material.

Figure 13:
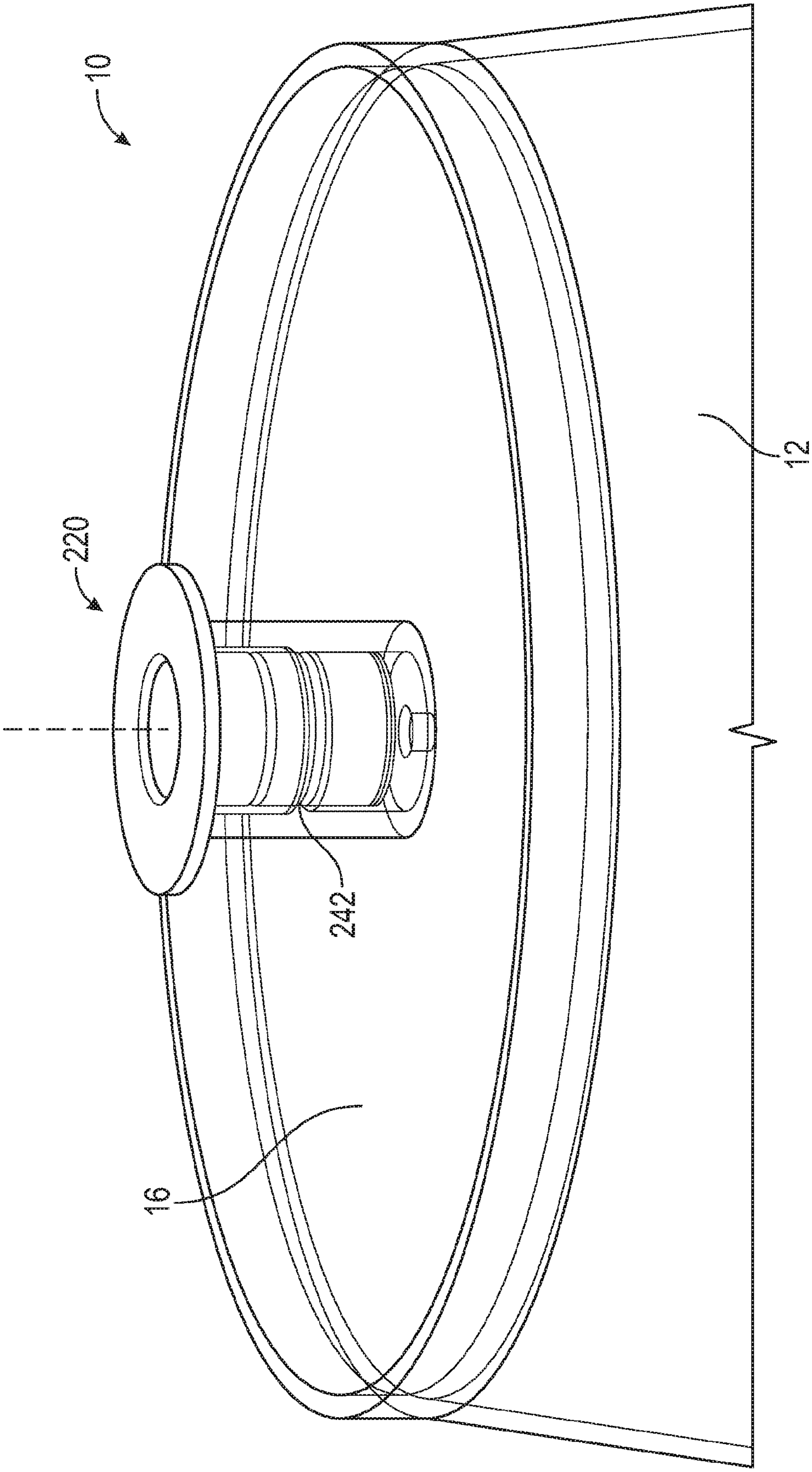
FIG. 13 is a perspective view of a reservoir containing a second embodiment of a vent assembly of the present disclosure.
Figure 14:
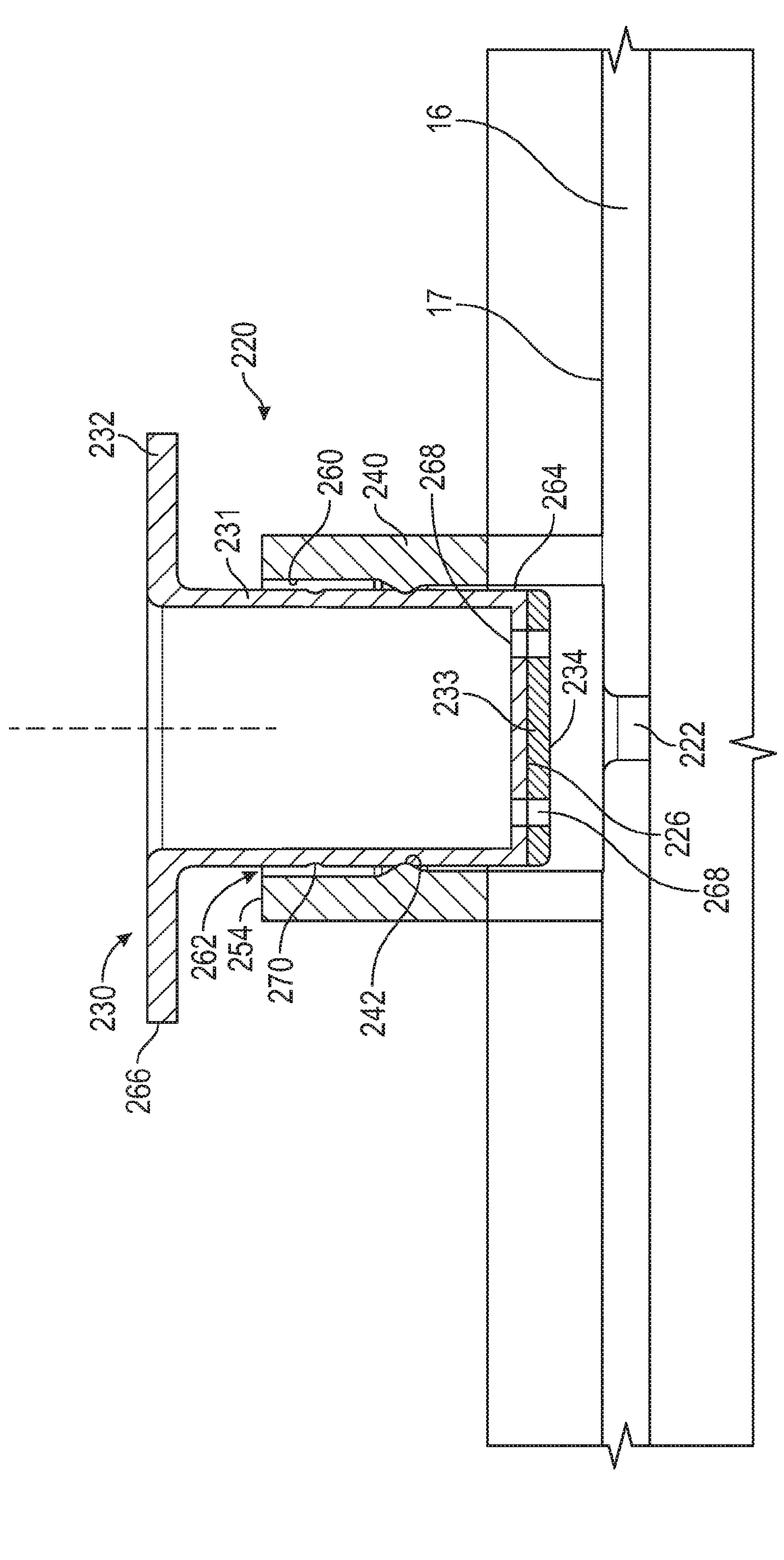
FIG. 14 is a cross-sectional view of the vent assembly in FIG. 13.

FIGS. 13 and 14 illustrate the reservoir 10 with a second embodiment of a vent assembly 220. The reservoir 10 was previously described with respect to the illustrate embodiment in FIGS. 1-10. Therefore, reference can be made thereto for a complete description of the various features of the reservoir. For simplicity, only a portion of the reservoir 10 is shown.

The vent assembly 220 comprises at least one aperture 222 formed in a wall of the reservoir 10. As with the embodiment illustrated in FIGS. 1-10, the vent assembly 220 in FIGS. 13 and 14 is located in the base 16 of the reservoir 10 but could be located in any wall of the reservoir with the base 16 being only one example of a wall in which the vent assembly 220 could be located. Furthermore, the reservoir 10 may include one or more vent assemblies and, in the instance of multiple vent assemblies, the vent assemblies could be located in the same wall or in different walls of the reservoir.

The vent assembly 220 includes a post 240 extending from the external surface 17 of the reservoir 10. The post 240 has an inner surface 260 that surrounds one or more apertures 222 that extend through the wall of the reservoir 10. The end of the post 240 opposite the wall of the reservoir 10 defines an opening 262. The closure member 230 is inserted into the opening 262 of the post 240. A closure member retainer 242 is located on the inner surface 260 of the post and creates a friction fit with the closure member 230. In some embodiments, as illustrated in FIG. 13, the closure member retainer 242 encircles the inner surface 260 of the post. In alternative embodiments, the closure member retainer may only partially encircle the inner surface. In some embodiments, the closure member retainer comprises one or more protrusions on the inner surface of the post, more preferably two or more protrusions that center the closure member in the post.

The closure member 230 comprises a first component 231 in the shape of a plug. In some embodiments, the first component is hollow. In other embodiments, the first component is solid throughout. The firsts component 231 is partially inserted into the post 240 so that a first end 264 resides in the post 240 and a second opposite end 266 extends past the opening 262 of the post 240. The second end 266 further comprises a flange that extends radially outward and perpendicular to the post 240. The flange can serve as a closure member extension 232 that allows the user to move the closure member 230 between vented and unvented positions. Although in FIG. 13 the closure member extension 232 completely surrounds the first component 231, in other embodiments the closure member extension does not completely surround the first component 231 (e.g., opposing tabs). Although not shown, the closure member 230 can include multiple flanges to further aid in sealing the post 240.

The vent assembly 220 further comprises a second component 233 that overlies a first major surface 226 of the first component 231. In at least one embodiment, the closure member 230 can be formed from only a conformable material such as the second component 233 and not a rigid material such as the first component 231.

As with the embodiment illustrated in FIGS. 1-10, the second component 233 can overlie all or only a portion of the first major surface 226 of the first component 231, provided that the second component 233 either covers the aperture 222 or seals off the aperture 222 when the closure member is in an unvented position. In FIG. 14, the second component 233 overlies the first major surface 226 at the first end 264 of the first component 231. The first and second components were each described with respect to the illustrate embodiment in FIGS. 1-10. Therefore, reference can be made thereto for a complete description of the various features of the components.

In one embodiment, as illustrated in FIG. 14, the closure member 230 comprises at least two apertures 268 in the closure member 230. An aperture 268 can be formed within the first component 231 and the second component 233 to form a passageway therein. The passageway can form an air path from the interior of the reservoir 10, through aperture 222 and at least one of apertures 268 to the atmosphere when in the vented position. The apertures 268 allow for venting to and from the reservoir 10 when the closure member 230 is in the vented position. In at least one embodiment, the aperture 222 can define an aperture axis (not shown) leading to the volume of the reservoir 10. The apertures 268 can each have their own aperture axis parallel to a sidewall of the closure member 230. In the unvented position, the aperture 222 forms an air-tight seal with the sealing surface 234. For example, no part of the aperture 222 is aligned with the aperture 268. For example, the aperture axis of aperture 222 does not line up with the aperture axis of any of the apertures 268. Alternatively, or in addition to the apertures 268, venting can occur between the closure member 230 and the inner surface 260 of the post 240.

In practice the vent assembly 220 is closed by pushing the closure member 230 into the post 240 until the first end 264 contacts the wall of the reservoir 10. The end of the post 240 defining the opening 262 can serve as a stop 254 to indicate when the closure member 230 is properly seated in the unvented position. In some embodiments, a notch 270 in the closure member 230 mechanically engages with the closure member retainer 242 to ensure the closure member 230 does not prematurely disengage from the unvented position. The vent assembly 220 is opened or "vented" by pulling the closure member 230 away from the wall of the reservoir so that venting can occur through the apertures 268 and/or space between the inner surface 260 of the post 240 and closure member 230. The closure member retainer 242 provides a friction fit that will allow the closure member 230 to remain in the post 240 when in both the vented and unvented positions.

Figure 15:
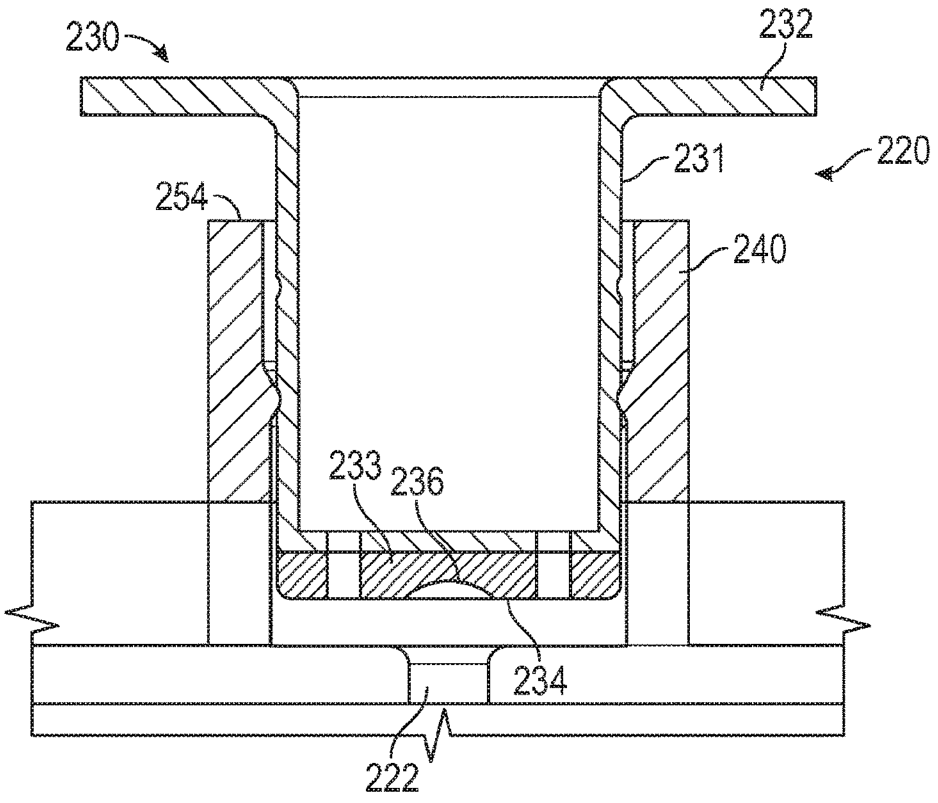
FIG. 15 is a cross-section view of an alternative closure member for the vent assembly in FIG. 13.
Figure 16:
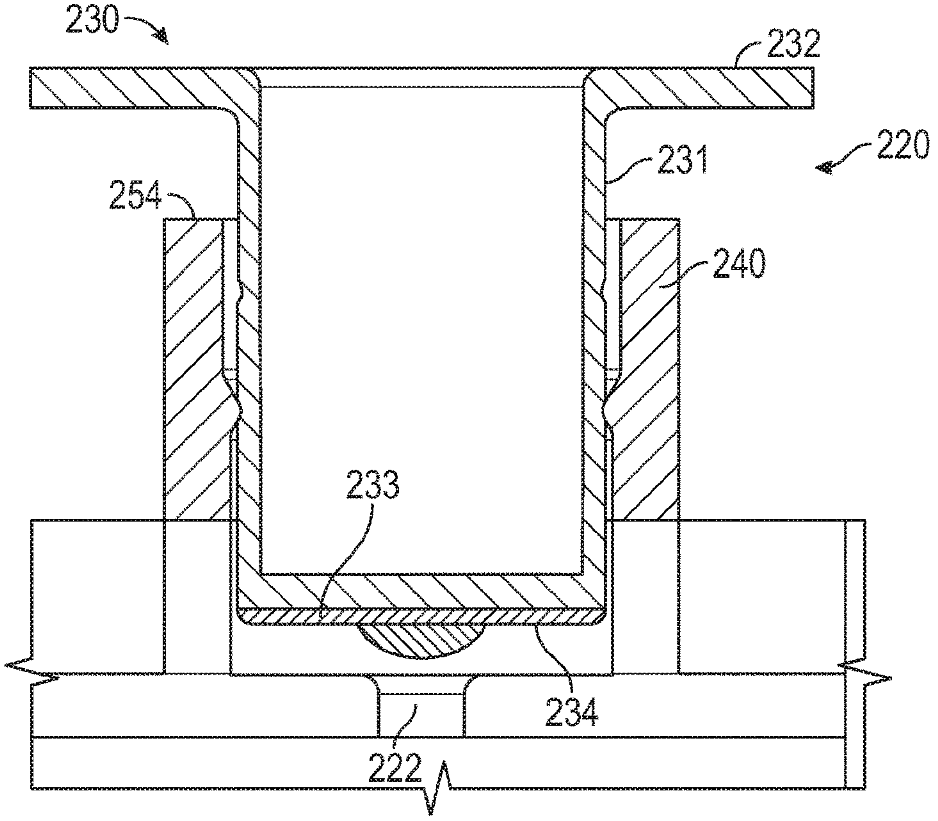
FIG. 16 is a cross-sectional view of yet another alternative closure member for the vent assembly in FIG. 13.

As with the embodiment in FIGS. 1-10, the sealing surface 234 may be configure so that it covers but does not protrude into the aperture 222 when the closure member 230 is in the unvented position. For example, in the embodiment illustrated in FIG. 15, the sealing surface 234 comprises a recess 236, at least a portion of which will lie directly over the aperture 222 when the closure member 230 is in the unvented position. Alternatively, as illustrated in FIG. 16, the sealing surface 234 may be configured to at least partially protrude into the aperture 222 when the closure member is in the unvented position.

As illustrated in FIG. 14, the second component 233 forms part of the closure member 230. The sealing surface 234 is then located on the second component 233. The second component 233 can follow the contours of the first component 231. The sealing surface 234 can further be configured to contact the external surface. In at least one embodiment, a face of the closure member extension 232 facing the exterior surface 17 can be configured to (i.e., have a dimension from the sealing surface 234 to the closure member extension 232) contact a distal end of the post 240 when a portion or the majority of the flange sealing surface 234 contacts the exterior surface. In at least one embodiment, the second component 233 can be molded over the sidewalls of the first component 231 (not shown) instead of being disposed on one surface of the closure member 230. The overmolding of the second component 233 can be any height relative to the flange 232 (including covering a portion of the flange 232). Alternatively, the second component can form part of the wall of the reservoir around the aperture 222, in which case the sealing surface is located on the first component. In either case, the second component 233 provides sufficient conformability between the wall of the reservoir and the closure member 230 to seal the vent assembly 220 when adjusted to the unvented position.

Figure 17:
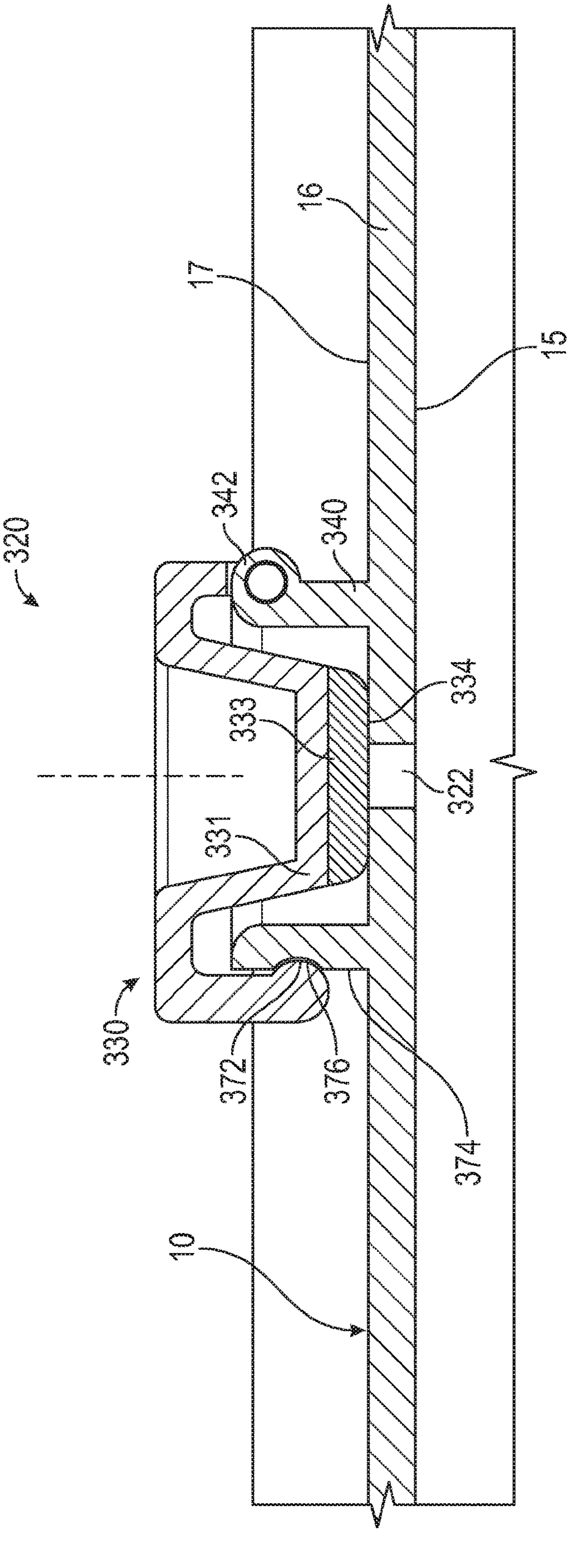
FIG. 17 is a cross-section view of another reservoir containing a third embodiment of a vent assembly of the present disclosure in an unvented position.
Figure 18:
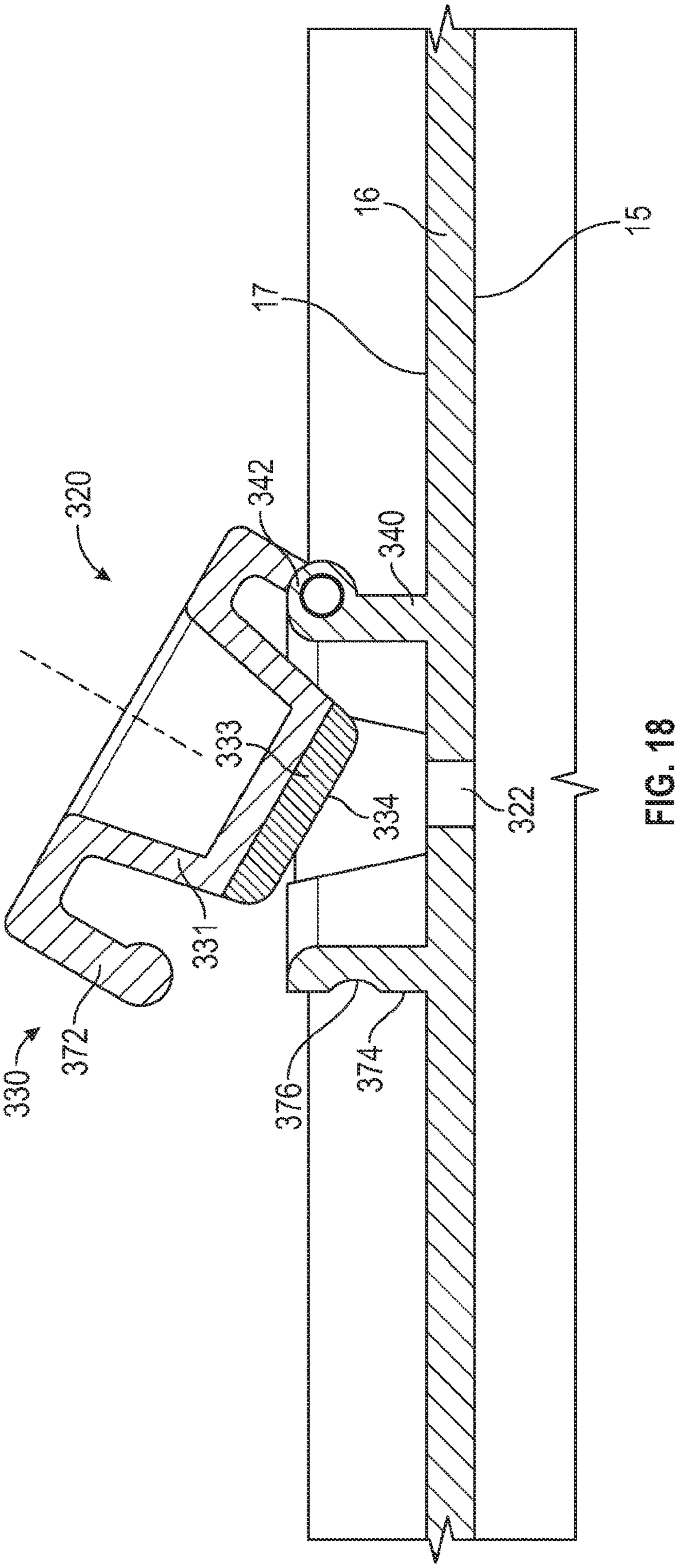
FIG. 18 is a cross-section view of the vent assembly in FIG. 17 in a vented position.

FIGS. 17 and 18 illustrate the reservoir 10 with a third embodiment of a vent assembly 320. The vent assembly 320 has many of the same features described above with respect to the vent assembly 220. However, the vent assembly 320 in FIGS. 17 and 18 differs in that the closure member 330 is hinged to the wall of the reservoir 10 through the closure member retainer 342. The closure member 330 may comprise a first component 331 and a second component 333 with a sealing surface 334 on the second component 333. Alternately, the second component forms part of the wall of the reservoir and the sealing surface is on the first component. In either case, the vent assembly is closed by rotating the closure member 333 about the closure member retainer 342 so that the sealing surface 334 covers the aperture 322, as illustrated in FIG. 17. In some embodiments, the closure member 330 includes a latch 372 that mechanically engages with a notch 376 in the outer surface 374 of the post 340 to insure the closure member 330 does not prematurely disengage from the post 340 when the closure member in in the unvented position. The closure member 330 can be moved to the vented position by unlatching the closure member 330 from the post 340 so that the sealing surface 334 no longer covers the aperture 322, as illustrated in FIG. 18.

The reservoir 10 and first and second components 331, 332 were previously described with respect to the illustrate embodiment in FIGS. 1-10. Therefore, reference can be made thereto for a complete description of the various features of the reservoir and components.

Some Embodiments of the Disclosure

In a first embodiment, the present disclosure provides a vent assembly comprising: an aperture formed in a wall of a reservoir, the reservoir having an internal surface defining the volume of the reservoir and an external surface; a closure member retained on the external surface of the reservoir, the closure member comprising a first component and a second component, the second component is relatively conformable compared to the first component, the second component positioned between the first component and the wall of the reservoir; a sealing surface on the first component or the second component, where the sealing surface closes the aperture when the closure member is in an unvented position and the sealing surface does not close the aperture when the closure member is in a vented position; a closure member retainer configured to retain the closure member on the reservoir; and a cam surface between the closure member and the wall of the reservoir, the cam surface configured to generate a compressive force on the sealing surface when the closure member is moved into the unvented position.

In at least one embodiment, the present disclosure provides that the first component is made of a material having a Shore A Hardness greater than 100 as measured by ASTM D2240 or the closure member comprising a first component made of a material having a modulus of elasticity greater than 100 MPa as measured by the Nano Indentation Test Method as described herein.

In at least one embodiment, the present disclosure provides that the second component is made of a material having a Shore A Hardness up to 100 as measured by ASTM D2240 or the closure member comprising a second component made of a material having a modulus of elasticity no greater than 100 MPa as measured by the Nano Indentation Test Method as described herein.

In a second embodiment, the present disclosure provides the vent assembly of the first embodiment, wherein the first component is made of a thermoplastic material.

In a third embodiment, the present disclosure provides the vent assembly of the first or second embodiment, wherein the first component comprises at least one of a polypropylene, a high density polyethylene (HDPE), a polyamide, a polyester, a glass-filled polyamide and an acetal.

In a fourth embodiment, the present disclosure provides the vent assembly of any one of the preceding embodiments, wherein the second component comprises at least one of a thermoplastic elastomer, a thermoplastic vulcanizate and a rubber.

In a fifth embodiment, the present disclosure provides the vent assembly of any one of the preceding embodiments, wherein the second component has a modulus of elasticity of less than 0.01 GPa.

In a sixth embodiment, the present disclosure provides the vent assembly of any one of the preceding embodiments, wherein the first component has a modulus of elasticity greater than the second component.

In a seventh embodiment, the present disclosure provides the vent assembly of any one of the preceding embodiments, wherein the closure member comprises both the first component and the second component, and the sealing surface is on the second component.

In an eighth embodiment, the present disclosure provides the vent assembly of any one of the first through sixth embodiments, wherein the closure member comprises the first component, and the second component forms at least part of the cam surface, where the sealing surface is on the first component.

In a ninth embodiment, the present disclosure provides the vent assembly of any one of the preceding embodiments, wherein the sealing surface at least partially protrudes into the aperture when the closure member is in the unvented position.

In a tenth embodiment, the present disclosure provides the vent assembly of any one of the first through eighth embodiments, wherein the sealing surface covers but does not protrude into the aperture when the closure member is in the unvented position.

In an eleventh embodiment, the present disclosure provides the vent assembly of any one of the preceding embodiments, wherein the reservoir comprises a container having an opening and a detachable lid configured to close the opening.

In a twelfth embodiment, the present disclosure provides the vent assembly of any one of the preceding claims, wherein the aperture is in the wall of the container.

In a thirteenth embodiment, the present disclosure provides the vent assembly of the first through eleventh embodiments, wherein the aperture is in the wall of the lid.

In a fourteenth embodiment, the present disclosure provides the vent assembly of any one of the preceding embodiments, wherein the closure member is configured for rotation about an axis extending through the wall of the reservoir when moving between the vented position and the unvented position.

In a fifteenth embodiment, the present disclosure provides the vent assembly of the fourteenth embodiment, wherein the axis is perpendicular to the wall of the reservoir proximate the aperture.

In a sixteenth embodiment, the present disclosure provides the vent assembly of the fourteenth or fifteenth embodiment, further comprising a post extending from the wall of the reservoir in a direction parallel to the axis, wherein the closure member is configured for rotation on the post, wherein the closure member retainer is located on the post and configured to retain the closure member on the post when the closure member is in the vented position, and wherein the compressive force is generated between the closure member retainer and the cam surface when the sealing surface is positioned over the aperture.

In a seventeenth embodiment, the present disclosure provides the vent assembly of the sixteenth embodiment, wherein the closure member retainer comprises a shoulder extending outwardly from the post relative to the axis.

In an eighteenth embodiment, the present disclosure provides the vent assembly of the seventeenth embodiment, wherein the closure member comprises an inner surface facing the post and a top surface facing away from the wall of the reservoir, wherein the inner surface and top surface of the closure member form an edge, and wherein the edge mechanically engages with the shoulder of the closure member retainer when the closure member is in the unvented position.

In a nineteenth embodiment, the present disclosure provides the vent assembly of any one of the preceding embodiments, wherein the aperture extends through the cam surface.

In a twentieth embodiment, the present disclosure provides the vent assembly of the nineteenth embodiment, wherein the cam surface comprises an aperture surface portion that is located in a plane that is perpendicular to the axis about which the closure member rotates, and wherein the aperture extends through the aperture surface portion of the cam surface.

In a twenty-first embodiment, the present disclosure provides the vent assembly of the eighteenth embodiment, wherein the vent assembly is configured so that:

$$0.9\ D1 \leq DV < D2 \text{ and } H1 < HV < 1.2\ H2$$

where

- D1 is the outer diameter of the post at its narrowest dimension;
- DV is the diameter of the inner surface of the closure member;
- D2 is the outer diameter of the closure member retainer as measured closest to the shoulder;
- HV is the thickness of the closure member;
- H1 is the height of the post, as measured from an aperture surface portion of the cam surface to the point at which the outer diameter of the post begins to increase;
- H2 is the height of the post, as measured from the aperture surface portion to the shoulder.

In an embodiment, the present disclosure provides that the use of a second component in the closure member allows for greater diameter and height tolerances compared to no use of the second component.

In a twenty-second embodiment, the present disclosure provide the vent assembly of any one of the preceding claims, further comprising a stop configured to limit movement of the closure member in one direction when the closure member is in the unvented position.

In a twenty-third embodiment, the present disclosure provides the vent assembly of the twenty-second embodiment, wherein the stop protrudes from the wall of the reservoir.

In a twenty-fourth embodiment, the present disclosure provides the vent assembly of the twenty-second or twenty-third embodiment, wherein the stop is located proximate the cam surface.

In a twenty-fifth embodiment, the present disclosure provides the vent assembly of any one of the preceding embodiments, wherein the vent assembly comprises a plurality of apertures, wherein the closure member comprises a plurality of sealing surfaces, and wherein each aperture of the plurality of apertures is closed by a sealing surface of the plurality of sealing surfaces when the closure member is in the unvented position.

In a twenty-sixth embodiment, the present disclosure provides the vent assembly of the twenty-fifth embodiment, wherein the closure member comprises a plurality of relief surfaces, wherein a relief surface is positioned above each aperture of the plurality of apertures when the closure member is in the vented position.

In a twenty-seventh embodiment, the present disclosure provides the vent assembly of the twenty-fifth or twenty-sixth embodiment, wherein the vent assembly comprises a plurality of cam surfaces, wherein each aperture of the plurality of apertures is located in a cam surface of the plurality of cam surfaces, and wherein each aperture of the plurality of apertures is closed by a sealing surface of the plurality of sealing surfaces when the closure member is in the unvented position.

In a twenty-eighth embodiment, the present disclosure provides the vent assembly of any one of the preceding claims, wherein the closure member is made by overmolding.

In a twenty-ninth embodiment, the present disclosure provides the vent assembly of any one of the preceding claims, wherein the closure member is made by insert molding.

In a thirtieth embodiment, the present disclosure provides a vent assembly comprising: an aperture formed in a wall of a reservoir, the reservoir having an internal surface defining the volume of the reservoir and an external surface; a closure member retained on the external surface of the reservoir, the closure member comprising a first component and a second component, the second component is relatively conformable compared to the first component, the second component positioned between the first component and the wall of the reservoir; a sealing surface on the first component or the second component, where the sealing surface closes the aperture when the closure member is in an unvented position and the sealing surface does not close the aperture when the closure member is in a vented position; a closure member retainer configured to retain the closure member on the reservoir, wherein the closure member is displaced from the wall of the reservoir when moving from the unvented position to the vented position.

In at least one embodiment, the present disclosure provides that the first component is made of a material having a Shore A Hardness greater than 100 as measured by ASTM D2240 or the closure member comprising a first component made of a material having a modulus of elasticity greater than 100 MPa as measured by the Nano Indentation Test Method as described herein.

In at least one embodiment, the present disclosure provides that the second component is made of a material having a Shore A Hardness up to 100 as measured by ASTM D2240 or the closure member comprising a second component made of a material having a modulus of elasticity no greater than 100 MPa as measured by the Nano Indentation Test Method as described herein.

In a thirty-first embodiment, the present disclosure provides the vent assembly of the thirtieth embodiment, wherein the first component is made of a thermoplastic material.

In a thirty-second embodiment, the present disclosure provides the vent assembly of the thirtieth or thirty-first embodiment, wherein the first component comprises at least one of a polypropylene, a high density polyethylene (HDPE), a polyamide, a polyester, a glass-filled polyamide and an acetal.

In a thirty-third embodiment, the present disclosure provides the vent assembly of any one of the thirtieth through thirty-second embodiments, wherein the second component comprises at least one of a thermoplastic elastomer, a thermoplastic vulcanizate and a rubber.

In a thirty-fourth embodiment, the present disclosure provides the vent assembly of any one of the thirtieth through thirty-third embodiments, wherein the second component has a modulus of elasticity of less than 0.1 GPa.

In a thirty-fifth embodiment, the present disclosure provides the vent assembly of any one of the thirtieth though thirty-fourth embodiments, wherein the first component has a modulus of elasticity greater than the second component.

In a thirty-sixth embodiment, the present disclosure provides the vent assembly of any one of the thirtieth through thirty-fifth embodiments, wherein the closure member comprises both the first component and the second component, and the sealing surface is on the second component.

In a thirty-seventh embodiment, the present disclosure provides the vent assembly of any one of the thirtieth through thirty-fifth embodiments, wherein the closure member comprises the first component, and the second component forms at least part of the wall of the reservoir, where the sealing surface is on the first component.

In a thirty-eight embodiment, the present disclosure provides the vent assembly of any one of the thirtieth through thirty-seventh embodiments, wherein the sealing surface at least partially protrudes into the aperture when the closure member is in the unvented position.

In a thirty-ninth embodiment, the present disclosure provides the vent assembly of any one of the thirtieth through thirty-seventh embodiments, wherein the sealing surface covers but does not protrude into the aperture when the closure member is in the unvented position.

In a fortieth embodiment, the present disclosure provides the vent assembly of any one of the thirtieth through thirty-ninth embodiments, wherein the reservoir comprises a container having an opening and a detachable lid configured to close the opening.

In a forty-first embodiment, the present disclosure provides the vent assembly of any one of the thirtieth through fortieth embodiments, wherein the aperture is in the wall of the container.

In a forty-second embodiment, the present disclosure provides the vent assembly of any one of the thirtieth through fortieth embodiments, wherein the aperture is in the wall of the lid.

In a forty-third embodiment, the present disclosure provides the vent assembly of any one of the thirtieth through forty-second embodiments, further comprising a post extending from the wall of the reservoir, the post having an inner surface that surrounds the aperture and an outer surface, the end of the post opposite the wall of the reservoir defining an opening, wherein the closure member is inserted into the opening of the post.

In a forty-fourth embodiment, the present disclosure provides the vent assembly of any one of the thirtieth through forty-third embodiments, wherein the closure member is configured for linear movement between the vented position and the unvented position.

In a forty-fifth embodiment, the present disclosure provides the vent assembly of any one of the thirtieth through forty-fourth embodiments, wherein the closure member retainer is located on the inner surface of the post, and the closure member retainer creates a friction fit with the closure member.

In a forty-sixth embodiment, the present disclosure provides the vent assembly of on any one of the thirtieth through forty-fifth embodiments, wherein the closure member comprises at least one aperture to permit venting through the closure member when the closure member is in the vented position.

In a forty-seventh embodiment, the present disclosure provides the vent assembly of any one of the thirtieth through forty-sixth embodiments, wherein venting occurs between the closure member and inner surface of the post when the closure member is in the vented position.

In a forty-eighth embodiment, the present disclosure provides the vent assembly of any one of the thirtieth through forty-second embodiments, further comprising a post extending from the wall of the reservoir, the post having an inner surface that surrounds the aperture and an outer surface, the end of the post opposite the wall of the reservoir defining an opening, wherein the closure member is hinged to the closure member retainer, and wherein the closure member is moved between the unvented position and vented position by rotation about the closure member retainer.

In a forty-ninth embodiment, the present disclosure provides the vent assembly of the forty-eighth embodiment, wherein the closure member further comprises a latch that mechanically engages with a notch in an outer surface of the post.

In a fiftieth embodiment, the present disclosure provides for a system comprising a) a paint cup reservoir for holding paint when attached to a paint gun having a wall, the paint cup reservoir having an internal surface defining the volume of the reservoir and an external surface, a first aperture formed in the wall, a post extending from the wall of the reservoir, the post having an inner surface that surrounds the first aperture and an outer surface, the end of the post opposite the wall of the reservoir defining an opening, and b) a closure member formed entirely from a conformable material, the closure member having second apertures that allow venting of the volume via the first aperture in a vented position and do not allow venting of the volume via the first aperture in an unvented position.

In at least one embodiment, the present disclosure provides for the reservoir having an opening, and c) a lid that is attachable to the opening, and optionally d) a paint gun, the lid attachable to the paint gun in a siphon or gravity feed operation.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials

| Abbreviation | Description and Source |
|---|---|
| ACE | Acetone, obtained from Keystone Automotive Operations, Inc., Exeter, PA. |
| BER | BERGAMID B70 H BLACK UV, obtained from PolyOne Corporation, Avon Lake, OH. |
| CRS | CrastinS600F40BK851, obtained from DuPont de Nemours, Inc., Wilmington, DE. |
| CYC | Cyclohexane, obtained from EMD Millipore Corp., Billerica, MA. |
| DELR | DuPont Delrin 500P, obtained from DuPont de Nemours, Inc., Wilmington, DE. |
| DELT | Deltron Solvent Borne Base Coat, Obtained from PPG Industries, Inc., Pittsburgh, PA. |
| ENV | Envirobase Waterborne Basecoat, obtained from PPG Industries, Inc., Pittsburgh, PA. |
| FC | Green Food Coloring, obtained from McCormick & Co., Baltimore, MD. |
| GLS | Glasurit Waterborne Basecoat, obtained from BASF, Ludwigshafen, Germany. |
| HDPE | Marlex 9006 Polyethylene, obtained from Chevron Phillips Chemical, The Woodlands, TX |
| HYL1 | Hylon (Nylon) N1013HL, obtained from Ravago Manufacturing Americas, LLC, Orlando FL. |
| HYL2 | Hylon (Nylon) N1000EHL, obtained from obtained from Ravago Manufacturing Americas, LLC, Orlando FL. |
| LDPE | Dow 722 Low Density Polyethylene Resin, obtained from Dow Chemical Co., Midland, MI |
| MEK | Methyl Ethyl Ketone, obtained from VWR Chemicals, West Chester, PA. |
| NYM | Nymax 623 Zip 5 HS BLK 13, obtained from PolyOne Corporation, Avon Lake, OH. |
| PB1 | SX840 Paint Blender, obtained from PPG Industries, Inc., Pittsburgh, PA. |
| PB2 | DT870 Paint Blender, obtained from PPG Industries, Inc., Pittsburgh, PA. |
| PET | Rynite 935 PET, obtained from Dupont de Nemours, Inc., Wilmington, DE. |
| PETG | Eastar 6763 PETG, obtained from Eastman Chemical Company, Kingsport, TN. |
| PP | BORPURE RJ377M obtained from Borealis, Vienna, Austria. |
| PP1 | Braskem RP 350 Polypropylene, obtained from Braskem USA, Philadelphia, PA |
| PK | Polyketone M330A, obtained from Hyosung Cooperation, Ulsan, Republic of Korea. |
| TB | TangoBlack FLX973, obtained from Stratysys, Ltd., Eden Prairie, MN. |
| TOL | Toluene, obtained from EMD Millipore Corp., Billerica, MA. |
| VF1 | Versaflex OM 1040X, obtained from PolyOne Corporation, Avon Lake, OH. |
| VF2 | Versaflex OM 6240, obtained from PolyOne Corporation, Avon Lake, OH. |
| VF3 | Versaflex OM9-801N, obtained from PolyOne Corporation, Avon Lake, OH. |
| VJF | VisiJet SL Flex, obtained from 3D Systems, Rock Hill, SC. |
| VW | Vero White RGD835, obtained from Stratysys, Ltd., Eden Prairie, MN. |
| XYL | Xylene, obtained from VWR Chemicals, West Chester, PA. |

Test Method 1: Leak Testing

Leakage tests were conducted on select reservoirs. A reservoir was place on a surface with the opening facing upward and the closure member in the unvented position, enabling the reservoir to be filled with fluid. Approximately 600 ml of water containing a few drops of FC to aid visual detection of a leak were added to each reservoir. A stopwatch was started when the dyed water was initially added to a reservoir and the reservoir was visually monitored for leakage over a 30 minute test duration. The reservoir was determined to leak with the appearance of a pendant droplet of the colored water outside the reservoir. Results are tabulated in Table 1. Reservoirs that did not leak within the 30 minute test period were given a value of "0"; reservoirs that leaked within the 30 minute test period were given a value of "1".

Comparative Examples represent vent assemblies having only the first component (i.e., no second component) and/or vent assemblies that completely failed the leak test or gave inconsistent results, demonstrating inability to accommodate variations due to manufacturing tolerances or environmental factors.

Test Method 2: Sealing Surface Uniformity

Samples consisted of reservoirs like those illustrated in FIG. 1A and made from PP by plastic injection molding. For the purposes of the test, the sealing surface was defined as the aperture surface portions of the vent assembly (see FIG. 3, element 52). The flatness of 160 samples (i.e., 40 reservoirs with four apertures each) was measured with an optical measurement system (SmartScope Flash 302, available from OGP—Optical Gaging Products, Rochester, New York). Four measurement locations were selected on each aperture surface portion of a reservoir, and the flatness was calculated as the orthogonal projection of the $4^{th}$ point onto a plane defined by points 1-3. Results are summarized in Table 2 and indicate an average flatness variation of 0.0016 inches (0.0406 mm), with a standard deviation of 0.0014 inches (0.0356 mm).

Test Method 3: Stability of Closure Members Made from Various Materials

The stability of various materials to a variety of solvents was assessed. The materials included NYM, PK, CRS, DELR, and PET. The materials were made into a single component closure member (similar to that illustrated in FIG. 1A without the second component) by plastic injection molding. Each closure member sample was weighed, and the inner diameters and heights were measured. The samples were then immersed in either water, CYC, ACE, TOL, XYL, or MEK. After 48 hours of immersion, the samples were removed, dried with a pneumatic blow gun, and weighed and measured again. Results of the testing are summarized in Table 3.

Test Method 4: Reservoir Storage Testing

The storage capability of a reservoir for a variety of solvents was assessed. The reservoirs were configured like those illustrated in FIG. 1*a*. The closure members had a first component made of DELR and a second component made of VF3.

A reservoir was place on a surface with the opening facing upward and the closure member in the unvented position, enabling the reservoir to be filled with fluid. Approximately 600 ml of fluid consisting of ACE, PB1, PB2, DELT, GLS or ENV were added to the reservoir followed by a few drops of FC to aid visual detection of a leak. A lid was used to seal the reservoir.

The vent assemblies of the reservoir were visually monitored for failure. A failure was noted if a leak was visually observed (as described in Test Method 1 above) or the closure member cracked or dissolved in the working fluid being tested. Failure monitoring was observed for up to 3 months. The resulting "Storage Time" and respective "Failure" is summarized in Table 4.

Test Method 5: Nano Indentation Test Method

The modulus of elasticity was assessed for a relatively thin sample (less than 6 mm thickness). The sample was oriented such that the sample is self-supported or where the thickness of the material of interest is much larger than the indentation depth (in the direction of indentation) to minimize the influence of any underlying layers on an indentation-based measurement. The indentation can be performed in an "in-plane" direction.

A cryo microtomy sample preparation method was used which involved cross-sectioning the samples and performing surface preparation using a microtome at cryogenic temperatures as shown below Cutting Temperatures

| Material | Cutting Temperature (° C.) |
|---|---|
| DELR | −72 |
| LDPE | −75 |
| HDPE | −20 |
| PP1 | −30 |
| VF3 | −115 |

A 1-micron diameter ruby sphere probe tip was used to perform the indentation. This is a round ruby that is well-suited for measuring relatively soft materials. A KLA Tencor Nano Indenter® G200 (commercially available from KLA-Tencor, Milpitas, California) with an XP indenter head was used to make all measurements. A minimum of 10 individual indentation measurements were performed on each sample with a minimum spacing of 250 microns. A surface detection criteria 100 N/m was used to define the surface of the test specimen during the approach of the indenter; and the indenter approach velocity was 50 nm/sec. Each indentation was performed to a target indentation depth of 1000 nm. Upon reaching the target indentation depth, a 10 second dwell was performed in load control prior to unloading. Both unloading and loading segments were performed at a constant target strain rate of 0.05; the target strain rate is defined as the loading rate (N/sec) divided by the load on the sample (N).

Individual measurements of elastic modulus were made using the unloading segment of each individual indentation. Elastic modulus was calculated using the maximum indentation depth at the beginning of the unloading segment and the slope of the unloading segment. The slope of the unloading segment was calculated using a linear regression using all unloading segment data between the maximum load and the load at 50% of maximum. Sample elastic modulus was calculated using the analytical solution of a rigid sphere in contact with an elastic half-space. In the case of each sample material, an estimate of the material's Poisson's ratio was used in the modulus calculations and these estimates are summarized in Table 5.

PREP & EXAMPLES

Figure 20:
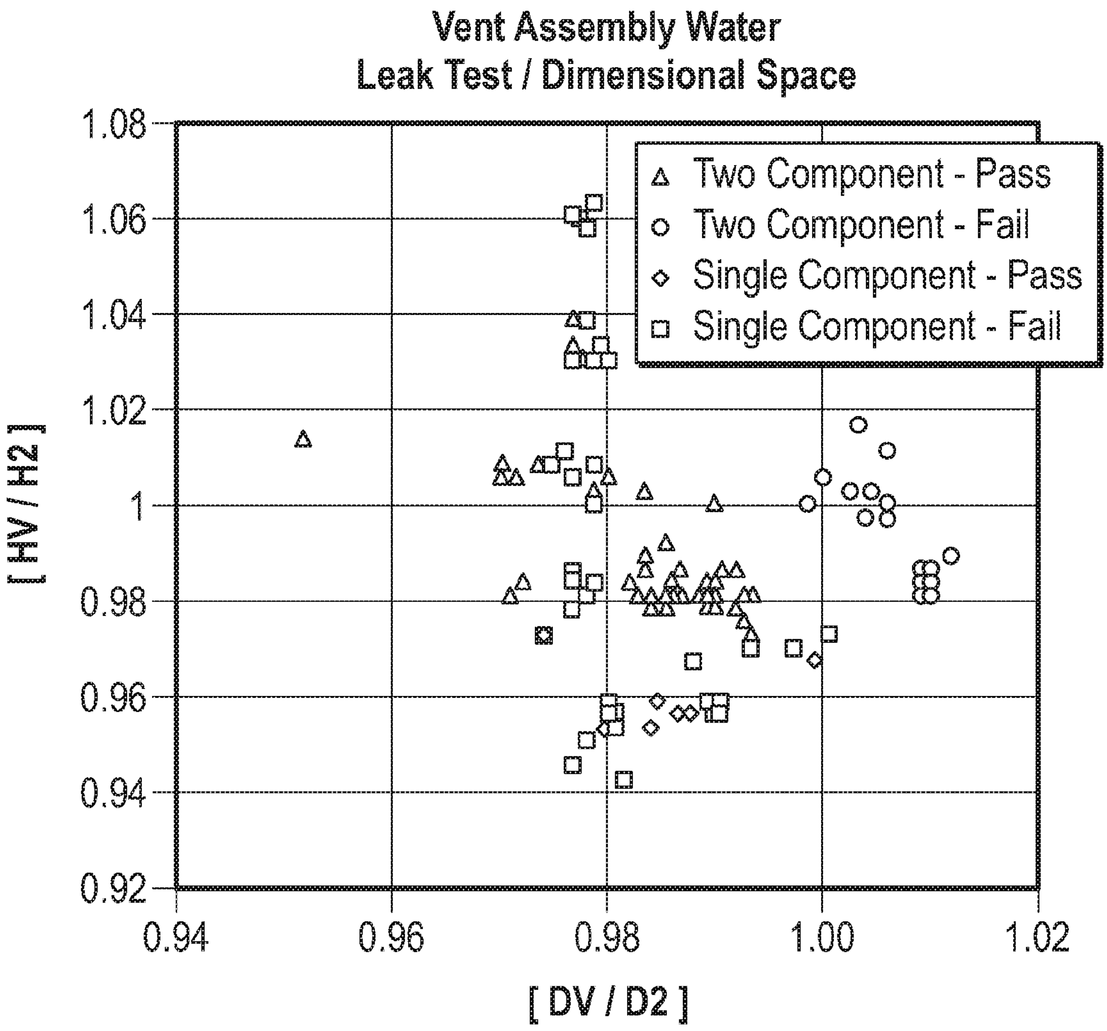
FIG. 20 is a plot of [HV/H2] versus [DV\D2] based upon data from Table 1 in the Examples section.

All examples utilized a reservoir having a singular sidewall with a circular cross-section, a base, an opening opposite the base, and a reservoir volume of about 700 ml. The reservoir was prepared from PP using a conventional injection molding process. The reservoir base contained four apertures, having a diameter of about 1.25 mm, located in a circular pattern each spaced at 90-degree intervals, similar to the vent assembly shown in FIG. 3. With reference to FIG. 20, the vent assembly composes a post 40 and a closure member retainer 42. The outer diameter (D2) of the closure member retainer 42 had an average value of 15.15 mm, and the height of the post (H2) as measured from the aperture surface portion 52 to the shoulder 44, had an average value of 3.65 mm.

The closure members were prepared using different manufacturing methods, as shown in Table 1. The manufacturing methods included 3D printing and injection molding. Materials utilized are referenced in Table 1. The height (HV) and inner diameter (DV) of each closure member, as illustrated in FIG. 19, were measured and recorded. Each reservoir was tested for leakage via the Test Method 1. The results are summarized in Table 1 and FIG. 20.

TABLE 1

Leak Testing Results.

| Example | MFG. Method | First Component | Second Component | HV/H2 | DV/D2 | Leak |
|---|---|---|---|---|---|---|
| Example 1 | 3D Printed | VW | TB | 1.00 | 0.98 | 0 |
| Example 2 | 3D Printed | VW | TB | 1.01 | 0.98 | 0 |
| Example 3 | 3D Printed | VW | TB | 1.00 | 0.98 | 0 |
| Example 4 | 3D Printed | VW | TB | 1.00 | 0.99 | 0 |
| Example 5 | 3D Printed | VW | TB | 1.01 | 0.97 | 0 |
| Example 6 | 3D Printed | VW | TB | 1.01 | 0.97 | 0 |
| Example 7 | 3D Printed | VW | TB | 1.01 | 0.97 | 0 |
| Example 8 | 3D Printed | VW | TB | 1.01 | 0.97 | 0 |
| Example 9 | 3D Printed | VW | TB | 1.03 | 0.98 | 0 |
| Example 10 | 3D Printed | VW | TB | 1.03 | 0.98 | 0 |
| Example 11 | 3D Printed | VW | TB | 1.04 | 0.98 | 0 |
| Example 12 | 3D Printed | VW | TB | 1.03 | 0.98 | 0 |
| Comparative Example 13 | Injection Molded | PET | VF1 | 0.99 | 1.01 | 1 |
| Comparative Example 14 | Injection Molded | PET | VF1 | 0.98 | 1.01 | 1 |
| Comparative Example 15 | Injection Molded | PET | VF1 | 0.98 | 1.01 | 1 |
| Comparative Example 16 | Injection Molded | PET | VF1 | 0.98 | 1.01 | 1 |
| Comparative Example 17 | Injection Molded | HYL1 | VF2 | 0.98 | 1.01 | 1 |
| Comparative Example 18 | Injection Molded | HYL1 | VF2 | 0.99 | 1.01 | 1 |
| Comparative Example 19 | Injection Molded | HYL1 | VF2 | 0.99 | 1.01 | 1 |
| Comparative Example 20 | Injection Molded | HYL1 | VF2 | 0.98 | 1.01 | 1 |
| Comparative Example 21 | Injection Molded | PETG | VF1 | 1.01 | 1.00 | 1 |
| Comparative Example 22 | Injection Molded | PETG | VF1 | 1.00 | 1.00 | 1 |
| Comparative Example 23 | Injection Molded | PETG | VF1 | 1.00 | 1.01 | 1 |
| Comparative Example 24 | Injection Molded | PETG | VF1 | 1.00 | 1.00 | 1 |
| Comparative Example 25 | Injection Molded | PETG | VF1 | 1.00 | 1.01 | 1 |
| Example 26 | Injection Molded | PETG | VF1 | 1.01 | 0.95 | 0 |
| Comparative Example 27 | Injection Molded | HYL2 | VF2 | 1.02 | 1.00 | 1 |
| Comparative Example 28 | Injection Molded | HYL2 | VF2 | 1.00 | 1.00 | 1 |
| Comparative Example 29 | Injection Molded | HYL2 | VF2 | 1.00 | 1.00 | 1 |
| Comparative Example 30 | Injection Molded | HYL2 | VF2 | 1.00 | 1.01 | 1 |
| Comparative Example 31 | Injection Molded | HYL2 | VF2 | 1.01 | 1.01 | 1 |
| Example 32 | Injection Molded | DELR | VF3 | 0.98 | 0.99 | 0 |
| Example 33 | Injection Molded | DELR | VF3 | 0.98 | 0.99 | 0 |
| Example 34 | Injection Molded | DELR | VF3 | 0.98 | 0.99 | 0 |
| Example 35 | Injection Molded | DELR | VF3 | 0.98 | 0.99 | 0 |
| Example 36 | Injection Molded | DELR | VF3 | 0.98 | 0.99 | 0 |
| Example 37 | Injection Molded | DELR | VF3 | 0.97 | 0.99 | 0 |
| Example 38 | Injection Molded | DELR | VF3 | 0.99 | 0.99 | 0 |
| Example 39 | Injection Molded | DELR | VF3 | 0.99 | 0.98 | 0 |
| Example 40 | Injection Molded | DELR | VF3 | 0.98 | 0.99 | 0 |
| Example 41 | Injection Molded | DELR | VF3 | 0.98 | 0.99 | 0 |
| Example 42 | Injection Molded | DELR | VF3 | 0.98 | 0.99 | 0 |
| Example 43 | Injection Molded | DELR | VF3 | 0.98 | 0.99 | 0 |
| Example 44 | Injection Molded | DELR | VF3 | 0.98 | 0.99 | 0 |
| Example 45 | Injection Molded | DELR | VF3 | 0.98 | 0.99 | 0 |
| Example 46 | Injection Molded | DELR | VF3 | 0.98 | 0.99 | 0 |
| Example 47 | Injection Molded | DELR | VF3 | 0.98 | 0.99 | 0 |
| Example 48 | Injection Molded | DELR | VF3 | 0.98 | 0.99 | 0 |
| Example 49 | Injection Molded | DELR | VF3 | 0.98 | 0.99 | 0 |
| Example 50 | Injection Molded | DELR | VF3 | 0.98 | 0.99 | 0 |
| Example 51 | Injection Molded | DELR | VF3 | 0.98 | 0.99 | 0 |

TABLE 1-continued

| Leak Testing Results. | | | | | | |
|---|---|---|---|---|---|---|
| Example | MFG. Method | First Component | Second Component | HV/H2 | DV/D2 | Leak |
| Example 52 | Injection Molded | DELR | VF3 | 0.98 | 0.99 | 0 |
| Example 53 | Injection Molded | DELR | VF3 | 0.99 | 0.99 | 0 |
| Example 54 | Injection Molded | DELR | VF3 | 0.98 | 0.99 | 0 |
| Example 55 | Injection Molded | DELR | VF3 | 0.99 | 0.98 | 0 |
| Example 56 | Injection Molded | DELR | VF3 | 0.98 | 0.98 | 0 |
| Example 57 | Injection Molded | DELR | VF3 | 0.99 | 0.99 | 0 |
| Example 58 | Injection Molded | DELR | VF3 | 0.98 | 0.99 | 0 |
| Example 59 | Injection Molded | DELR | VF3 | 0.98 | 0.99 | 0 |
| Example 60 | Injection Molded | DELR | VF3 | 0.98 | 0.99 | 0 |
| Example 61 | Injection Molded | DELR | VF3 | 0.99 | 0.99 | 0 |
| Example 62 | Injection Molded | DELR | VF3 | 0.98 | 0.99 | 0 |
| Example 63 | Injection Molded | DELR | VF3 | 0.98 | 0.98 | 0 |
| Example 64 | Injection Molded | DELR | VF3 | 0.98 | 0.98 | 0 |
| Example 65 | Injection Molded | DELR | VF3 | 0.98 | 0.98 | 0 |
| Example 66 | Injection Molded | DELR | VF3 | 0.98 | 0.98 | 0 |
| Example 67 | Injection Molded | DELR | VF3 | 0.98 | 0.97 | 0 |
| Example 68 | Injection Molded | DELR | VF3 | 0.98 | 0.99 | 0 |
| Example 69 | Injection Molded | DELR | VF3 | 0.98 | 0.97 | 0 |
| Comparative Example 70 | Injection Molded | BER | N/A | 0.97 | 1.00 | 1 |
| Comparative Example 71 | Injection Molded | BER | N/A | 0.97 | 1.00 | 1 |
| Comparative Example 72 | Injection Molded | BER | N/A | 0.97 | 1.00 | 0 |
| Comparative Example 73 | Injection Molded | BER | N/A | 0.97 | 0.99 | 1 |
| Comparative Example 74 | Injection Molded | BER | N/A | 0.96 | 0.99 | 1 |
| Comparative Example 75 | Injection Molded | BER | N/A | 0.96 | 0.99 | 1 |
| Comparative Example 76 | Injection Molded | BER | N/A | 0.96 | 0.99 | 1 |
| Comparative Example 77 | Injection Molded | BER | N/A | 0.96 | 0.99 | 1 |
| Comparative Example 78 | Injection Molded | BER | N/A | 0.96 | 0.98 | 0 |
| Comparative Example 79 | Injection Molded | BER | N/A | 0.96 | 0.99 | 0 |
| Comparative Example 80 | Injection Molded | BER | N/A | 0.96 | 0.99 | 0 |
| Comparative Example 81 | Injection Molded | BER | N/A | 0.95 | 0.98 | 0 |
| Comparative Example 82 | Injection Molded | CRS | N/A | 0.96 | 0.98 | 1 |
| Comparative Example 83 | Injection Molded | CRS | N/A | 0.95 | 0.98 | 0 |
| Comparative Example 84 | Injection Molded | CRS | N/A | 0.95 | 0.98 | 1 |
| Comparative Example 85 | Injection Molded | CRS | N/A | 0.96 | 0.98 | 1 |
| Comparative Example 86 | Injection Molded | CRS | N/A | 0.97 | 0.99 | 1 |
| Comparative Example 87 | 3D Printed | VJF | N/A | 0.94 | 0.98 | 1 |
| Comparative Example 88 | 3D Printed | VJF | N/A | 0.95 | 0.98 | 1 |
| Comparative Example 89 | 3D Printed | VJF | N/A | 0.96 | 0.98 | 1 |
| Comparative Example 90 | 3D Printed | VJF | N/A | 0.98 | 0.98 | 1 |
| Comparative Example 91 | 3D Printed | VJF | N/A | 0.95 | 0.98 | 1 |
| Comparative Example 92 | 3D Printed | VJF | N/A | 0.98 | 0.98 | 1 |
| Comparative Example 93 | 3D Printed | VJF | N/A | 0.98 | 0.98 | 1 |
| Comparative Example 94 | 3D Printed | VJF | N/A | 0.97 | 0.97 | 1 |
| Comparative Example 95 | 3D Printed | VJF | N/A | 0.99 | 0.98 | 1 |
| Comparative Example 96 | 3D Printed | VJF | N/A | 0.98 | 0.98 | 1 |
| Comparative Example 97 | 3D Printed | VJF | N/A | 1.01 | 0.98 | 1 |

TABLE 1-continued

Leak Testing Results.

| Example | MFG. Method | First Component | Second Component | HV/H2 | DV/D2 | Leak |
|---|---|---|---|---|---|---|
| Comparative Example 98 | 3D Printed | VJF | N/A | 1.00 | 0.98 | 1 |
| Comparative Example 99 | 3D Printed | VJF | N/A | 1.01 | 0.98 | 1 |
| Comparative Example 100 | 3D Printed | VJF | N/A | 1.01 | 0.97 | 1 |
| Comparative Example 101 | 3D Printed | VJF | N/A | 1.01 | 0.98 | 1 |
| Comparative Example 102 | 3D Printed | VJF | N/A | 1.03 | 0.98 | 1 |
| Comparative Example 103 | 3D Printed | VJF | N/A | 1.03 | 0.98 | 1 |
| Comparative Example 104 | 3D Printed | VJF | N/A | 1.03 | 0.98 | 1 |
| Comparative Example 105 | 3D Printed | VJF | N/A | 1.04 | 0.98 | 1 |
| Comparative Example 106 | 3D Printed | VJF | N/A | 1.03 | 0.98 | 1 |
| Comparative Example 107 | 3D Printed | VJF | N/A | 1.06 | 0.98 | 1 |
| Comparative Example 108 | 3D Printed | VJF | N/A | 1.06 | 0.98 | 1 |
| Comparative Example 109 | 3D Printed | VJF | N/A | 1.06 | 0.98 | 1 |
| Comparative Example 110 | 3D Printed | VJF | N/A | 1.06 | 0.98 | 1 |
| Comparative Example 111 | 3D Printed | VJF | N/A | 1.06 | 0.98 | 1 |

TABLE 2

Sealing Surface Uniformity Results

| Example | Sealing Surface Flatness inches (mm) |
|---|---|
| Example 112 | 0.0001 (0.00254) |
| Example 113 | 0.0027 (0.0686) |
| Example 114 | 0.0013 (0.0330) |
| Example 115 | 0.0048 (0.121) |
| Example 116 | 0.0057 (0.145) |
| Example 117 | 0.0015 (0.0381) |
| Example 118 | 0.0000 (0.000) |
| Example 119 | 0.0021 (0.0533) |
| Example 120 | 0.0003 (0.0076) |
| Example 121 | 0.0039 (0.0991) |

TABLE 3

Stability of Closure Members Made from Various Materials

| | | | Initial | | | 48 Hour | | | % Change | | |
|---|---|---|---|---|---|---|---|---|---|---|---|
| Example | Resin Type | Fluid | Closure Member Mass [g] | Closure Member Inner Diameter [mm] | Closure Member Height [mm] | Closure Member Mass [g] | Closure Member Inner Diameter [mm] | Closure Member Height [mm] | 48 Hr. Mass Change [%] | 48 Hr. Inner Diameter [%] | 48 Hr. Height Change [%] |
| Example 122 | NMY | water | 1.2881 | 14.92 | 3.97 | 1.366 | 15.04 | 4.03 | 6.0% | 0.8% | 1.5% |
| Example 123 | NMY | water | 1.289 | 14.88 | 3.97 | 1.3691 | 15.04 | 4.03 | 6.2% | 1.1% | 1.5% |
| Example 124 | NMY | water | 1.2892 | 14.91 | 3.97 | 1.3708 | 15.09 | 4.04 | 6.3% | 1.2% | 1.8% |
| Example 125 | NMY | water | 1.2902 | 14.92 | 3.98 | 1.369 | 15.08 | 4.04 | 6.1% | 1.1% | 1.5% |
| Example 126 | NMY | water | 1.288 | 14.92 | 3.97 | 1.3695 | 15.06 | 4.03 | 6.3% | 0.9% | 1.5% |
| Example 127 | NMY | water | 1.2879 | 14.91 | 3.98 | 1.3682 | 15.07 | 4.03 | 6.2% | 1.1% | 1.3% |
| Example 128 | NMY | water | 1.2885 | 14.92 | 3.98 | 1.3691 | 15.06 | 4.04 | 6.3% | 0.9% | 1.5% |
| Example 129 | NMY | water | 1.2909 | 14.91 | 3.97 | 1.3681 | 15.07 | 4.03 | 6.0% | 1.1% | 1.5% |
| Example 130 | NMY | water | 1.2878 | 14.93 | 3.97 | 1.3674 | 15.09 | 4.04 | 6.2% | 1.1% | 1.8% |
| Example 131 | NMY | water | 1.2883 | 14.93 | 3.98 | 1.368 | 15.09 | 4.04 | 6.2% | 1.1% | 1.5% |
| Example 132 | PK | water | 1.2178 | 14.84 | 3.9 | 1.236 | 14.93 | 3.92 | 1.5% | 0.6% | 0.5% |
| Example 133 | PK | water | 1.2181 | 14.81 | 3.91 | 1.2361 | 14.93 | 3.92 | 1.5% | 0.8% | 0.3% |
| Example 134 | PK | water | 1.2186 | 14.84 | 3.92 | 1.2372 | 14.92 | 3.95 | 1.5% | 0.5% | 0.8% |
| Example 135 | PK | water | 1.2184 | 14.82 | 3.91 | 1.2371 | 14.95 | 3.92 | 1.5% | 0.9% | 0.3% |
| Example 136 | PK | water | 1.2181 | 14.8 | 3.9 | 1.2371 | 14.94 | 3.93 | 1.6% | 0.9% | 0.8% |

TABLE 3-continued

Stability of Closure Members Made from Various Materials

| Example | Resin Type | Fluid | Initial Closure Closure Member Mass [g] | Initial Closure Member Inner Diameter [mm] | Initial Closure Closure Member Height [mm] | 48 Hour Closure Closure Member Mass [g] | 48 Hour Closure Member Inner Diameter [mm] | 48 Hour Closure Closure Member Height [mm] | % Change 48 Hr. Mass Change [%] | % Change 48 Hr. Inner Diameter [%] | % Change 48 Hr. Height Change [%] |
|---|---|---|---|---|---|---|---|---|---|---|---|
| Example 137 | PK | water | 1.2182 | 14.83 | 3.91 | 1.2368 | 14.92 | 3.93 | 1.5% | 0.6% | 0.5% |
| Example 138 | PK | water | 1.2185 | 14.83 | 3.91 | 1.2367 | 14.94 | 3.93 | 1.5% | 0.7% | 0.5% |
| Example 139 | PK | water | 1.2185 | 14.84 | 3.91 | 1.237 | 14.93 | 3.93 | 1.5% | 0.6% | 0.5% |
| Example 140 | PK | water | 1.2183 | 14.82 | 3.9 | 1.2368 | 14.94 | 3.93 | 1.5% | 0.8% | 0.8% |
| Example 141 | PK | water | 1.2185 | 14.83 | 3.9 | 1.2372 | 14.95 | 3.93 | 1.5% | 0.8% | 0.8% |
| Example 142 | DELR | water | 1.5324 | 14.79 | 3.92 | 1.5465 | 14.88 | 3.93 | 0.9% | 0.6% | 0.3% |
| Example 143 | DELR | water | 1.5348 | 14.79 | 3.92 | 1.5496 | 14.86 | 3.92 | 1.0% | 0.5% | 0.0% |
| Example 144 | DELR | water | 1.5309 | 14.79 | 3.92 | 1.5454 | 14.87 | 3.92 | 0.9% | 0.5% | 0.0% |
| Example 145 | DELR | water | 1.5328 | 14.79 | 3.93 | 1.5474 | 14.86 | 3.94 | 1.0% | 0.5% | 0.3% |
| Example 146 | DELR | water | 1.5321 | 14.79 | 3.93 | 1.5465 | 14.87 | 3.93 | 0.9% | 0.5% | 0.0% |
| Example 147 | DELR | water | 1.5312 | 14.79 | 3.92 | 1.5459 | 14.86 | 3.92 | 1.0% | 0.5% | 0.0% |
| Example 148 | DELR | water | 1.5316 | 14.79 | 3.92 | 1.5454 | 14.86 | 3.93 | 0.9% | 0.5% | 0.3% |
| Example 149 | DELR | water | 1.5317 | 14.79 | 3.92 | 1.5462 | 14.87 | 3.93 | 0.9% | 0.5% | 0.3% |
| Example 150 | DELR | water | 1.5335 | 14.79 | 3.92 | 1.5483 | 14.86 | 3.94 | 1.0% | 0.5% | 0.5% |
| Example 151 | DELR | water | 1.5349 | 14.79 | 3.92 | 1.5509 | 14.86 | 3.93 | 1.0% | 0.5% | 0.3% |
| Example 152 | CRS | water | 1.439 | 14.83 | 3.92 | 1.4416 | 14.86 | 3.92 | 0.2% | 0.2% | 0.0% |
| Example 153 | CRS | water | 1.4404 | 14.85 | 3.92 | 1.443 | 14.87 | 3.93 | 0.2% | 0.1% | 0.3% |
| Example 154 | CRS | water | 1.44 | 14.83 | 3.92 | 1.4429 | 14.87 | 3.93 | 0.2% | 0.3% | 0.3% |
| Example 155 | CRS | water | 1.4367 | 14.84 | 3.92 | 1.4397 | 14.87 | 3.92 | 0.2% | 0.2% | 0.0% |
| Example 156 | CRS | water | 1.4363 | 14.83 | 3.93 | 1.4388 | 14.87 | 3.92 | 0.2% | 0.3% | −0.3% |
| Example 157 | CRS | water | 1.4377 | 14.84 | 3.92 | 1.442 | 14.86 | 3.93 | 0.3% | 0.1% | 0.3% |
| Example 158 | CRS | water | 1.4421 | 14.84 | 3.93 | 1.4485 | 14.86 | 3.94 | 0.4% | 0.1% | 0.3% |
| Example 159 | CRS | water | 1.4363 | 14.84 | 3.92 | 1.4392 | 14.87 | 3.92 | 0.2% | 0.2% | 0.0% |
| Example 160 | CRS | water | 1.4391 | 14.83 | 3.92 | 1.443 | 14.87 | 3.92 | 0.3% | 0.3% | 0.0% |
| Example 161 | CRS | water | 1.4383 | 14.83 | 3.92 | 1.4415 | 14.86 | 3.92 | 0.2% | 0.2% | 0.0% |
| Example 162 | DELR/VF3 | water | 1.0614 | 15.02 | 3.56 | 1.0683 | 15.11 | 3.54 | 0.7% | 0.6% | −0.6% |
| Example 163 | DELR/VF3 | water | 1.061 | 15.02 | 3.54 | 1.0678 | 15.12 | 3.54 | 0.6% | 0.7% | 0.0% |
| Example 164 | DELR/VF3 | water | 1.0619 | 15.02 | 3.54 | 1.0684 | 15.1 | 3.53 | 0.6% | 0.5% | −0.3% |
| Example 165 | DELR/VF3 | water | 1.0611 | 15.02 | 3.54 | 1.0677 | 15.1 | 3.54 | 0.6% | 0.5% | 0.0% |
| Example 166 | DELR/VF3 | water | 1.0608 | 15.02 | 3.54 | 1.067 | 15.1 | 3.53 | 0.6% | 0.5% | −0.3% |
| Example 167 | NMY | CYC | 1.2969 | 14.92 | 3.98 | 1.2983 | 14.93 | 3.98 | 0.1% | 0.1% | 0.0% |
| Example 168 | NMY | ACE | 1.2894 | 14.93 | 3.98 | 1.2918 | 14.94 | 3.98 | 0.2% | 0.1% | 0.0% |
| Example 169 | NMY | TOL | 1.289 | 14.93 | 3.98 | 1.2908 | 14.93 | 3.98 | 0.1% | 0.0% | 0.0% |
| Example 170 | NMY | XYL | 1.2889 | 14.92 | 3.98 | 1.2903 | 14.94 | 3.98 | 0.1% | 0.1% | 0.0% |
| Example 171 | NMY | MEK | 1.2888 | 14.94 | 3.98 | 1.2889 | 14.94 | 3.98 | 0.0% | 0.0% | 0.0% |
| Example 172 | PK | CYC | 1.2178 | 14.8 | 3.91 | 1.2324 | 14.84 | 3.93 | 1.2% | 0.3% | 0.5% |
| Example 173 | PK | ACE | 1.2177 | 14.81 | 3.91 | 1.2368 | 15 | 3.93 | 1.6% | 1.3% | 0.5% |
| Example 174 | PK | TOL | 1.2174 | 14.82 | 3.91 | 1.2492 | 14.94 | 3.95 | 2.6% | 0.8% | 1.0% |
| Example 175 | PK | XYL | 1.2183 | 14.84 | 3.92 | 1.2417 | 14.86 | 3.95 | 1.9% | 0.1% | 0.8% |
| Example 176 | PK | MEK | 1.218 | 14.82 | 3.91 | 1.228 | 14.9 | 3.92 | 0.8% | 0.5% | 0.3% |
| Example 177 | DELR | CYC | 1.532 | 14.78 | 3.92 | 1.5331 | 14.79 | 3.91 | 0.1% | 0.1% | −0.3% |
| Example 178 | DELR | ACE | 1.532 | 14.78 | 3.92 | 1.553 | 14.96 | 3.94 | 1.4% | 1.2% | 0.5% |
| Example 179 | DELR | TOL | 1.5347 | 14.78 | 3.91 | 1.5408 | 14.83 | 3.92 | 0.4% | 0.3% | 0.3% |
| Example 180 | DELR | XYL | 1.534 | 14.79 | 3.91 | 1.5387 | 14.83 | 3.9 | 0.3% | 0.3% | −0.3% |
| Example 181 | DELR | MEK | 1.5335 | 14.79 | 3.92 | 1.5486 | 14.9 | 3.91 | 1.0% | 0.7% | −0.3% |
| Example 182 | CRS | CYC | 1.4426 | 14.82 | 3.93 | 1.4437 | 14.85 | 3.91 | 0.1% | 0.2% | −0.5% |
| Example 183 | CRS | ACE | 1.442 | 14.83 | 3.93 | 1.45 | 14.84 | 3.93 | 0.6% | 0.1% | 0.0% |
| Example 184 | CRS | TOL | 1.4394 | 14.87 | 3.92 | 1.446 | 14.87 | 3.92 | 0.5% | 0.0% | 0.0% |
| Example 185 | CRS | XYL | 1.4365 | 14.82 | 3.91 | 1.4379 | 14.83 | 3.91 | 0.1% | 0.1% | 0.0% |
| Example 186 | CRS | MEK | 1.4362 | 14.82 | 3.92 | 1.4441 | 14.85 | 3.91 | 0.6% | 0.2% | −0.3% |
| Example 187 | PET | CYC | 0.8922 | 15.31 | 2.32 | 0.8935 | 15.31 | 2.32 | 0.1% | 0.0% | 0.0% |
| Example 188 | PET | ACE | 0.8928 | 15.31 | 2.32 | 0.9347 | 15.26 | 2.4 | 4.7% | −0.3% | 3.4% |
| Example 189 | PET | TOL | 0.8942 | 15.33 | 2.32 | 0.9247 | 15.28 | 2.39 | 3.4% | −0.3% | 3.0% |
| Example 190 | PET | XYL | 0.89 | 15.32 | 2.32 | 0.9025 | 15.28 | 2.35 | 1.4% | −0.3% | 1.3% |
| Example 191 | PET | MEK | 0.8924 | 15.3 | 2.32 | 0.9349 | 15.25 | 2.41 | 4.8% | −0.3% | 3.9% |

TABLE 4

| Reservoir Storage Test Results | | | | | |
|---|---|---|---|---|---|
| Example | Working Fluid | Fluid Type | Storage Time (Days) | Failure | Notes |
| Example 192 | ACE | Solvent | 21 | Y | VF3 Cracked |
| Example 193 | PB1 | Paint Blender | 24 | Y | VF3 Dissolved |
| Example 194 | PB2 | Paint Reducer | 56 | Y | VF3 Dissolved |
| Example 200 | DELT | Paint (Solvent) | 86 | N | Test Stopped (No Failure) |
| Example 201 | DELT | Paint (Solvent) | 86 | N | Test Stopped (No Failure) |
| Example 202 | GLS | Paint (Waterborne) | 96 | N | Test Stopped (No Failure) |
| Example 203 | GLS | Paint (Waterborne) | 96 | N | Test Stopped (No Failure) |
| Example 204 | ENV | Paint (Waterborne) | 96 | N | Test Stopped (No Failure) |
| Example 205 | ENV | Paint (Waterborne) | 96 | N | Test Stopped (No Failure) |

TABLE 5

| Elastic Modulus | | | | |
|---|---|---|---|---|
| Material | Component | Elastic Modulus (GPa) | Sample Size (Number of Indents) | Assumed Poisson' ratio |
| PP1 | First Component | 1.30 | 28 | 0.43 |
| DELR | First Component | 2.20 | 13 | 0.35 |
| DELR | First Component | 2.47 | 19 | 0.35 |
| HDPE | First Component | 1.05 | 27 | 0.45 |
| LDPE | First Component | 0.150 | 20 | 0.45 |
| VF3 | Second Component | 0.00495 | 20 | 0.49 |
| VF3 | Second Component | 0.00560 | 24 | 0.49 |

Thus, the present disclosure provides, among other thing, vent assemblies. Various features and advantages of the vent assemblies are set forth in the following claims

What is claimed is:

1. A vent assembly comprising:

an aperture formed in a wall of a reservoir, the reservoir having an internal surface defining a volume of the reservoir and an external surface;

a closure member retained on the external surface of the reservoir, the closure member comprising a first component and a second component, the second component positioned between the first component and the wall of the reservoir, wherein the first component has a modulus of elasticity greater than the second component, wherein the first component and the second component are both part of the same closure member and are secured to each other;

a sealing surface on the first component or the second component, where the sealing surface closes the aperture when the closure member is in an unvented position and the sealing surface does not close the aperture when the closure member is in a vented position;

a closure member retainer configured to retain the closure member on the reservoir;

a cam surface between the closure member and the wall of the reservoir, the cam surface configured to generate a compressive force on the sealing surface when the closure member is moved into the unvented position;

wherein the cam surface is configured to convert rotational movement of the closure member into linear displacement, thereby generating the compressive force on the sealing surface to ensure a secure seal over the aperture when the closure member is in the unvented position, wherein the cam surface is a contoured surface on the closure member that interacts with a corresponding surface on the wall of the reservoir to achieve the linear displacement and sealing effect.

2. A vent assembly comprising:

an aperture formed in a wall of a reservoir, the reservoir having an internal surface defining a volume of the reservoir and an external surface;

a closure member retained on the external surface of the reservoir, the closure member comprising a first component and a second component, the second component positioned between the first component and the wall of the reservoir, wherein the first component has a modulus of elasticity greater than the second component, wherein the first component and the second component are both part of the same closure member and are secured to each other;

a sealing surface on the first component or the second component, where the sealing surface closes the aperture when the closure member is in an unvented position and the sealing surface does not close the aperture when the closure member is in a vented position;

a closure member retainer configured to retain the closure member on the reservoir;

a cam surface between the closure member and the wall of the reservoir, the cam surface configured to generate a compressive force on the sealing surface when the closure member is moved into the unvented position;

wherein the closure member is configured for rotation about an axis extending through the wall of the reservoir when moving between the vented position and the unvented position;

wherein the vent assembly further comprises a post extending from the wall of the reservoir in a direction parallel to the axis, wherein the closure member is configured for rotation on the post, wherein the closure member retainer is located on the post and configured to retain the closure member on the post when the closure member is in the vented position, and wherein the compressive force is generated between the closure member retainer and the cam surface when the sealing surface is positioned over the aperture, wherein the closure member retainer comprises a shoulder extending outwardly from the post relative to the axis wherein the closure member comprises an inner surface facing the post and a top surface facing away from the wall of the reservoir, wherein the inner surface and top surface of the closure member form an edge, and wherein the edge mechanically engages with the shoulder of the closure member retainer when the closure member is in the unvented position, wherein the vent assembly is configured so that:

$$0.9D1 \leq DV < D2 \text{ and } H1 < HV < 1.2H2,$$

wherein:

D1 is the outer diameter of the post at its narrowest dimension;

DV is the diameter of the inner surface of the closure member;

D2 is the outer diameter of the closure member retainer as measured closest to the shoulder;

HV is the thickness of the closure member;

H1 is the height of the post, as measured from an aperture surface portion of the cam surface to the point at which the outer diameter of the post begins to increase;

H2 is the height of the post, as measured from the aperture surface portion to the shoulder.

* * * * *